United States Patent
Wang et al.

(10) Patent No.: US 8,099,042 B2
(45) Date of Patent: Jan. 17, 2012

(54) METHOD AND SYSTEM FOR A RELIABLE RELAY-ASSOCIATED AND OPPORTUNISTIC COOPERATIVE TRANSMISSION SCHEMES

(75) Inventors: Dandan Wang, Richardson, TX (US); Chia-Chin Chong, Santa Clara, CA (US); Ismail Guvenc, Santa Clara, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/101,646

(22) Filed: May 5, 2011

(65) Prior Publication Data
US 2011/0207397 A1    Aug. 25, 2011

Related U.S. Application Data

(62) Division of application No. 12/130,807, filed on May 30, 2008, now Pat. No. 8,010,041.

(60) Provisional application No. 60/947,183, filed on Jun. 29, 2007, provisional application No. 60/951,532, filed on Jul. 24, 2007.

(51) Int. Cl.
*H04B 7/185* (2006.01)

(52) U.S. Cl. .......... 455/13.1; 455/7; 455/11.1; 370/315

(58) Field of Classification Search .............. 455/7, 11.1, 455/13.1, 16, 41.2, 515, 522, 63.1, 67.11, 455/67.13, 67.16, 552.1, 115.1, 154.1, 150.1; 370/315, 328, 342, 286
See application file for complete search history.

(56) References Cited

U.S. PATENT DOCUMENTS

| | | | |
|---|---|---|---|
| 6,169,880 B1 * | 1/2001 | La Fratta et al. | 455/11.1 |
| 2003/0022626 A1 * | 1/2003 | Miquel et al. | 455/24 |
| 2008/0113617 A1 * | 5/2008 | Braithwaite | 455/7 |
| 2008/0137585 A1 * | 6/2008 | Loyola et al. | 370/315 |
| 2008/0285499 A1 * | 11/2008 | Zhang et al. | 370/315 |

* cited by examiner

*Primary Examiner* — Tan Trinh
(74) *Attorney, Agent, or Firm* — Haynes & Boone, LLP.

(57) ABSTRACT

A cooperative communication scheme is provided for a base station (BS) to communicate with a mobile station (MS) through a group of relay stations (RSs). The RSs, collectively referred to as a relay-associated group of RSs (R-group), serve the same target MS. The R-group may be formed during initial ranging or during periodical ranging of the MSs, according to the channel conditions between the MSs and the RSs. A reliable relay-associated transmission scheme provides fast recovery and reduces the burden on the BS. In one exemplary scheme, the BS transmits data to the R-group. To ensure that reliable transmission exists between the BS and the R-group, the BS initially sends the information to all the RSs in the R-group using multicast or unicast mode. In one embodiment, after receiving the packets from the BS, each RS in the R-group calculates its reliability value according to a reliability function which may depend on (a) the channel conditions between the BS and the RSs, (b) the channel conditions between the RSs and the MS, and (c) the load status at the RSs. The RSs then feedback their reliability values in a message ("relay-associated acknowledgement message" or R-ACK).

4 Claims, 28 Drawing Sheets

Key To FIG. 20

| FIG. 20a |
| FIG. 20b |
| FIG. 20c |

Key To

| FIG. 21a |
| FIG. 21b |
| FIG. 21c |

METHOD AND SYSTEM FOR A RELIABLE RELAY-ASSOCIATED AND OPPORTUNISTIC COOPERATIVE TRANSMISSION SCHEMES

CROSS REFERENCE TO RELATED APPLICATIONS

This application is a divisional application of U.S. patent application Ser. No. 12/130,807 filed May 30, 2008, which in turn claims the benefit of (a) U.S. Provisional Patent Application, entitled "Method and System for Reliable Relay-Associated Transmission Scheme," provisional application No. 60/947,183, filed on Jun. 29, 2007; and (b) U.S. Provisional Patent Application, entitled "Method and System for Opportunistic Cooperative Transmission Scheme," provisional application No. 60/951,532, filed on Jul. 24, 2007. The disclosures of these prior provisional patent applications are hereby incorporated by reference in their entireties.

BACKGROUND OF THE INVENTION

1. Field of the Invention

The present invention relates to wireless communication. In particular, the present invention relates to communication between a mobile station (MS) and elements of a wireless network through one or more relay stations (RSs).

2. Discussion of the Related Art

Various cooperative transmission schemes are known to use virtual antenna systems to achieve cooperative diversity. Most of such cooperative transmission systems, however, focus on a single relay or ignore the latency caused by the unreliability between base stations (BSs) and the RSs.

One cooperative transmission scheme is disclosed in the article "Distributed space-time-coded protocols for exploiting cooperative diversity in wireless networks," by J. N. Laneman and G. W. Wornell, published in IEEE Trans. Inf. Theory, vol. 49, no. 10, pp. 2415-2425, October 2003 ("Laneman I"). In Laneman I, space-time coded cooperative diversity protocols are developed for combating multipath fading across multiple protocol layers in a wireless network. In that article, the authors prove theoretically that a space-time coded cooperative diversity scheme can provide full spatial diversity. However, the article does not show clearly how the protocols may be implemented in practice.

Another cooperative transmission scheme is disclosed in the article "Cooperative diversity in wireless networks: Efficient protocols and outage behavior," by J. N. Laneman, D. N. C. Tse, and G. W. Womell, published in IEEE Trans. Inf. Theory, vol. 51, no. 12, pp. 3062-3080, December 2004 ("Laneman II"). In Laneman II, the authors disclose efficient protocols to achieve cooperative diversity. There, several strategies employed by the cooperating radios are outlined, including fixed relaying schemes (e.g., amplify-and-forward and decode-and-forward schemes, relay selection schemes that adapt based upon channel measurements between the cooperating terminals, and incremental relaying schemes that adapt based upon limited feedback from the destination terminal). To improve spectral efficiency, a hybrid automatic-repeat-request (HARQ) is introduced between the BS and the MS. However, Laneman II does not address the possibility of a long delay that may result when the data received at the RSs are not reliable.

A different approach is discussed in the article "Practical relay networks: A generalization of hybrid-ARQ," by B. Zhao and M. C. Valenti, published in IEEE J. Sel. Areas Commun., vol. 23, no. 1, pp. 7-18, January 2005 ("Zhao"). Zhao discloses multiple relays operating over orthogonal time slots, based on a generalization of HARQ. Unlike conventional HARQ, retransmitted packets need not originate from the original source; rather, retransmission packets may be sent by RSs that overhear the transmission. Similarly, other HARQ-based schemes are discussed in the articles (a) "Achievable diversity-multiplexing-delay tradeoff in half-duplex ARQ relay channels", by T. Tabet, S. Dusad and R. Knopp, published in Proc. IEEE Int. Sym. On Inf. Theory, pp. 1828-1832, September 2005 ("Tabet"); and (b) "Hybrid-ARQ in multi-hop networks with opportunistic relay selection" ("Lo"), by C. K. Lo, R. W. Heath, Jr. and S. Vishwanath, published in Proc. IEEE Int. Conf. on Acoustics, Speech, and Signal Proc., pp. 617-620, April, 2007. Tabet and Lo both discuss HARQ-based schemes for delay-limited fading single relay channel. However, Zhao, Tabet and Lo are all limited to a single RS. Cooperation among several RSs is not exploited.

U.S. Patent Application Publication 2006/0239222 A1, entitled "Method of providing cooperative diversity in a MIMO wireless network," by S. Kim and H. Kim ("Kim"), discloses a method for providing cooperative diversity in a multiple-input-multiple-output (MIMO) wireless network. In Kim, the RSs check for errors, relay the verified streams (i.e., "correct" streams) and ask for the retransmission of error streams from the BS. However, Kim's method investigates only a single RS and does not consider cooperative diversity.

Three cooperative relay schemes are discussed in the articles (a) "Cooperative relay approaches in IEEE 802.16j," W. Ni, L. Cai, G. Shen and S. Jin, published as IEEE C80216j-07/258, March 2007 ("Ni") and (b) "Clarifications on cooperative relaying," by J. Chui, A. Chindapol, K. Lee, Y. Kim, C. Kim, B. Kwak, S. Chang, D. H. Ahn, Y. Kim, C. Lee, B. Yoo, P. Wang, A. Boariu, S. Maheshwari and Y. Saifullah, published in IEEE C80216j-07/242r2, March 2007 ("Chui"). The cooperative relay schemes are (i) cooperative source diversity, (ii) cooperative transmit diversity and (iii) cooperative hybrid diversity. However, none of these cooperative relay schemes consider the reliability of the channels between BS and RSs. When the information regenerated by the RSs is not reliable, the effects of cooperative diversity may deteriorate, thereby degrading the overall performance at the MSs.

The article "An ARQ in 802.16j," by S. Jin, C. Yoon, Y. Kim, B. Kwak, K. Lee, A. Chindapol and Y. Saifullah, published in IEEE C802.16j-07/250r4, March 2007 ("Jin") discloses a cooperative scheme in which ARQ provides fast recovery of the source data. In Jin, the BS retransmits source information when any RS fails to receive a block from the BS. Jin's scheme reduces latency by retransmitting only between RSs and the BS. However, when multiple RSs are present, a substantial delay may result if the BS has to retransmit until all RSs successfully receive the source block. The retransmission also reduces spectral efficiency. Jin's model can be improved as it is not necessary for all RSs to receive the correct source block. As long as a significant number of RSs receive the source block reliably, the other unreliable RSs may obtain the correct source block by overhearing the transmissions between the reliable RSs and the MSs.

While most cooperative schemes (e.g., Zhao, Tabet and Lo) assume only one RS is involved in the retransmission at each hop, such schemes fail to realize that multiple RSs can provide higher cooperative diversity. Also, the reliability of the channel between BS and RSs are not considered in some cooperative schemes, such as Laneman I and II, Ni and Chui. Unreliable information at the RSs may degrade MS performance and may cause extensive delays.

Retransmission by the BS also reduces spectral efficiency of the system. As discussed in Jin, a BS has to retransmit the data even if only one RS does not obtain the reliable data.

Such a scheme introduces latency and may result in a deadlock between the BS and RSs when the number of RSs increases.

Except for Zhao, all the above schemes ignore the radio resources among RSs (i.e., the RS which does not receive the reliable information from the BS may be able to overhear the transmission between the reliable RSs and the MSs). Zhao, however, focuses on selecting one RS at each hop.

SUMMARY

According to one embodiment of the invention, a "reliable relay-associated transmission scheme" provides fast recovery and reduces the burden of the BS. In such a scheme, the BS transmits data to a relay-associated group ("R-group") of RSs which serve the same target MS. The RSs are grouped, for example, during the initial ranging and periodical ranging of the MSs, which are carried out according to channel conditions between all the MSs and the RSs. A transmission scheme according to the present invention ensures reliable transmission between the BS and the R-group. The BS initially sends information to all the RSs in the R-group using either multicast or unicast mode. After receiving the information from the BS, each RS in the R-group calculates a reliability value according to a reliability function involving one or more parameters, such as channel conditions between the BS and the RSs, channel conditions between the RSs and the MS, load status at the RSs, queuing length at the RSs. Thereafter, the RSs feedback their reliability values in a relay-associated acknowledgement message (R-ACK).

If a BS sends the data to the RSs using unicast mode, R-ACK is simple to implement. However, unicast mode requires substantial data transmission resources between the BS and the RSs. If a BS sends the data to the RSs using multicast mode, R-ACK has to be feedback at different times, frequencies or space to avoid collision. After the BS receives all or even part of the R-ACK, a reliability metric is generated and compared with a pre-defined threshold value. If the reliability metric is greater than or equal to the pre-defined threshold value, the R-group becomes a "reliable R-group" and the transmission between the R-group and the target MS can begin. Otherwise, retransmissions between the BS and the R-group continue until the reliability metric is no less than the pre-defined threshold value, or until the number of retransmissions exceeds a pre-determined limit.

One advantage of the present invention provides reliable transmissions between the BS and the RSs through a reliability function at the RSs and a reliability metric at the BS. The RSs feedback their reliability values to the BS according to (a) the channel conditions between the BS and the RSs, (b) the channel conditions between the RSs and the target MS, and (c) the load situation at the RSs. The BS retransmits the packets to all the RSs until the reliability metric at the BS is not less than the pre-defined threshold value.

One embodiment of the present invention provides an opportunistic cooperative transmission scheme in which the BS can now opportunistically select part of the RSs to cooperatively transmit packets to the target MS based on both the channel conditions between the BS and the RSs and the link quality between the RSs and the target MS. After reliable transmission between the BS and R-group is initiated, the BS does not retransmit the source information, so as to reduce latency and to release the BS in order to implement other functionalities. The retransmission is controlled by the R-group. The unreliable RSs overhearing the transmission between the reliable RSs and the target MS can provide a higher cooperative diversity.

In particular, as the BS does not retransmit the packets to an R-group after the reliable transmission between the BS and the R-group is realized, the present invention reduces both the workload of the BS and the latency of the packets, relative to the prior art solutions. Then the forward transmission only happens between the R-group and the MS.

One advantage of the present invention utilizes radio resources among RSs. When an unreliable RS overhears a transmission between a reliable RS or connecting RS and the target MS, the unreliable RS joins the retransmission to provide cooperative diversity through this overheard information.

The present invention is better understood upon consideration of the detailed description below, in conjunction with the accompanying drawings.

BRIEF DESCRIPTION OF THE DRAWINGS

FIG. 18, showing a first frame of three successive frames ("frame j").

FIG. 18, showing a second frame of three successive frames ("frame (j+1)").

FIG. 18, showing a third frame of three successive frames ("frame (j+2)").

DETAILED DESCRIPTION OF THE PREFERRED EMBODIMENTS

Figure 1:
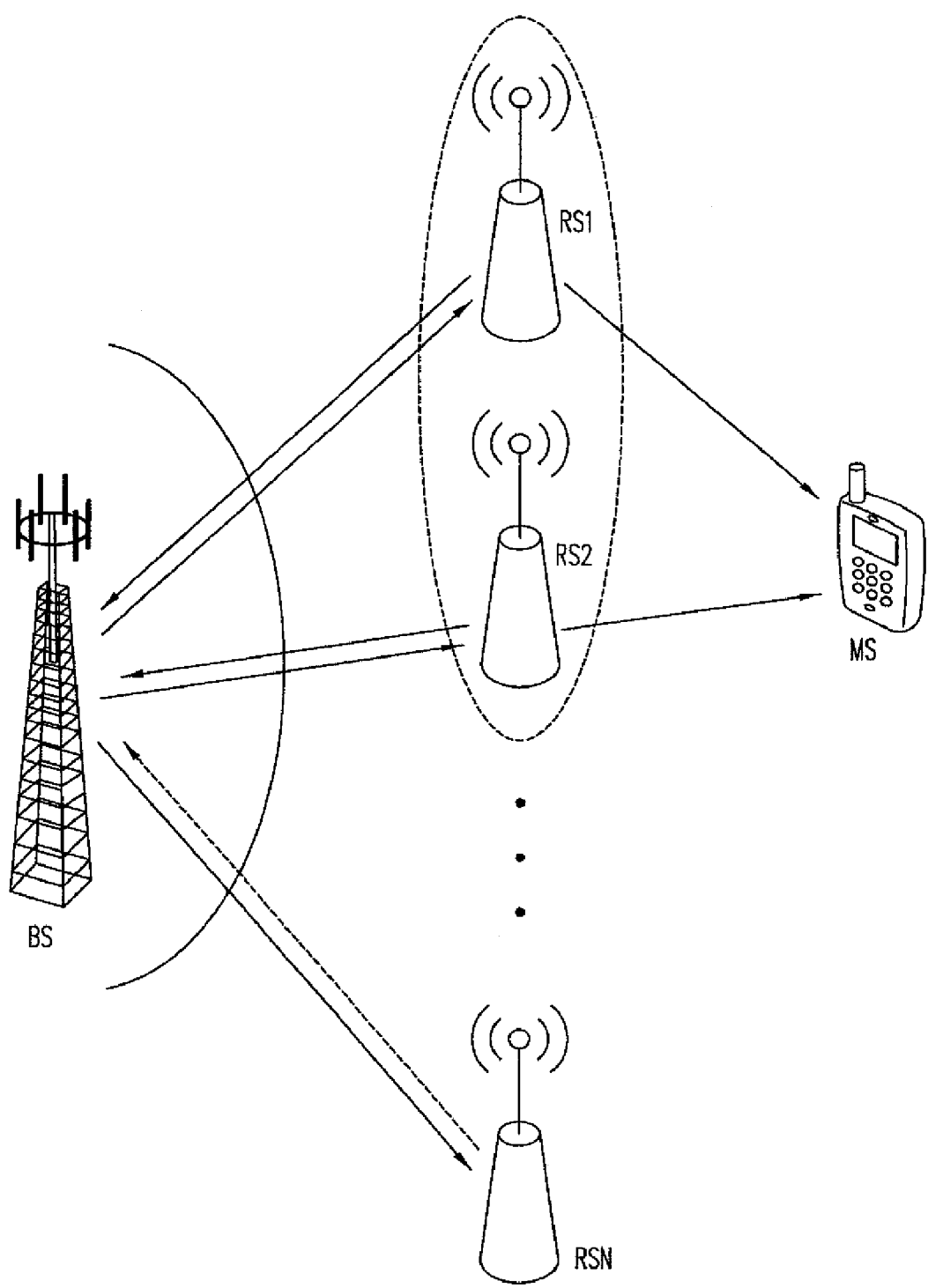
FIG. 1 shows communication between a BS and an MS with a group of RSs, in accordance with one embodiment of the present invention.

FIG. 1 shows communication between a BS and an MS with a group of RSs, in accordance with one embodiment of the present invention. In a direct communication between a BS and an MS without relaying, the BS transmits symbols to the MS within a pre-defined frame structure that is specified by the wireless access system. Often, however, due to multipath propagation effects (e.g., path loss, fading, and shadowing) and the limited range of the BS, a direct transmission between BS and MS may not be possible. One possible solution uses relay elements (i.e., RSs) between BS and MS. FIG. 1 shows a group of RSs whose membership is decided, for example, during an initial ranging or a periodical ranging process. Usually, the RSs are included in the group when their respective channel condition metrics to the target MS exceed a pre-defined threshold value. This group of RSs (i.e., $RS_1$, $RS_2$, ..., $RS_N$) is referred to as a "relay-associated group" ("R-group") for the target MS. Conversely, the MS is said to be in the "serving lists" of $RS_1$, $RS_2$, ..., $RS_N$. The association of RSs and MSs are periodically reported to the BS. Other RSs (i.e., RSs whose channel condition metrics to the target MS are less than the pre-defined threshold value) belong to the "non-relay associated group" ("non-R-group") of RSs.

Figure 2:
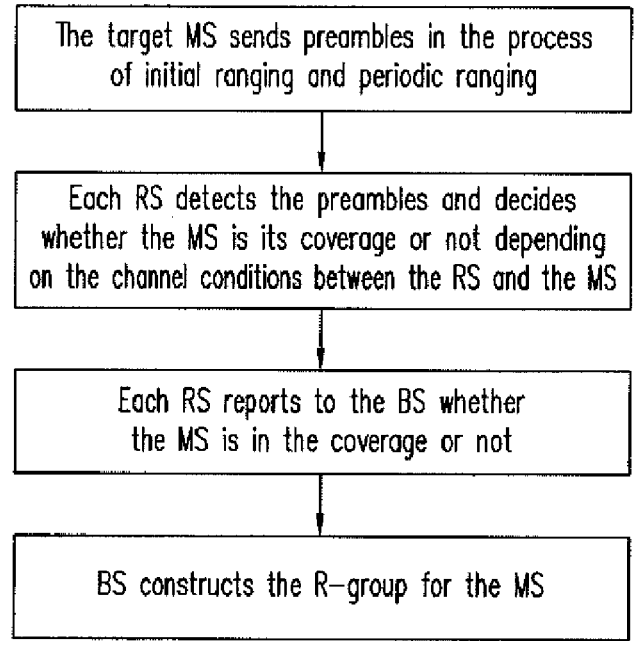
FIG. 2 illustrates, generally, how an R-group is constituted, according to one embodiment of the present invention.
Figure 4:
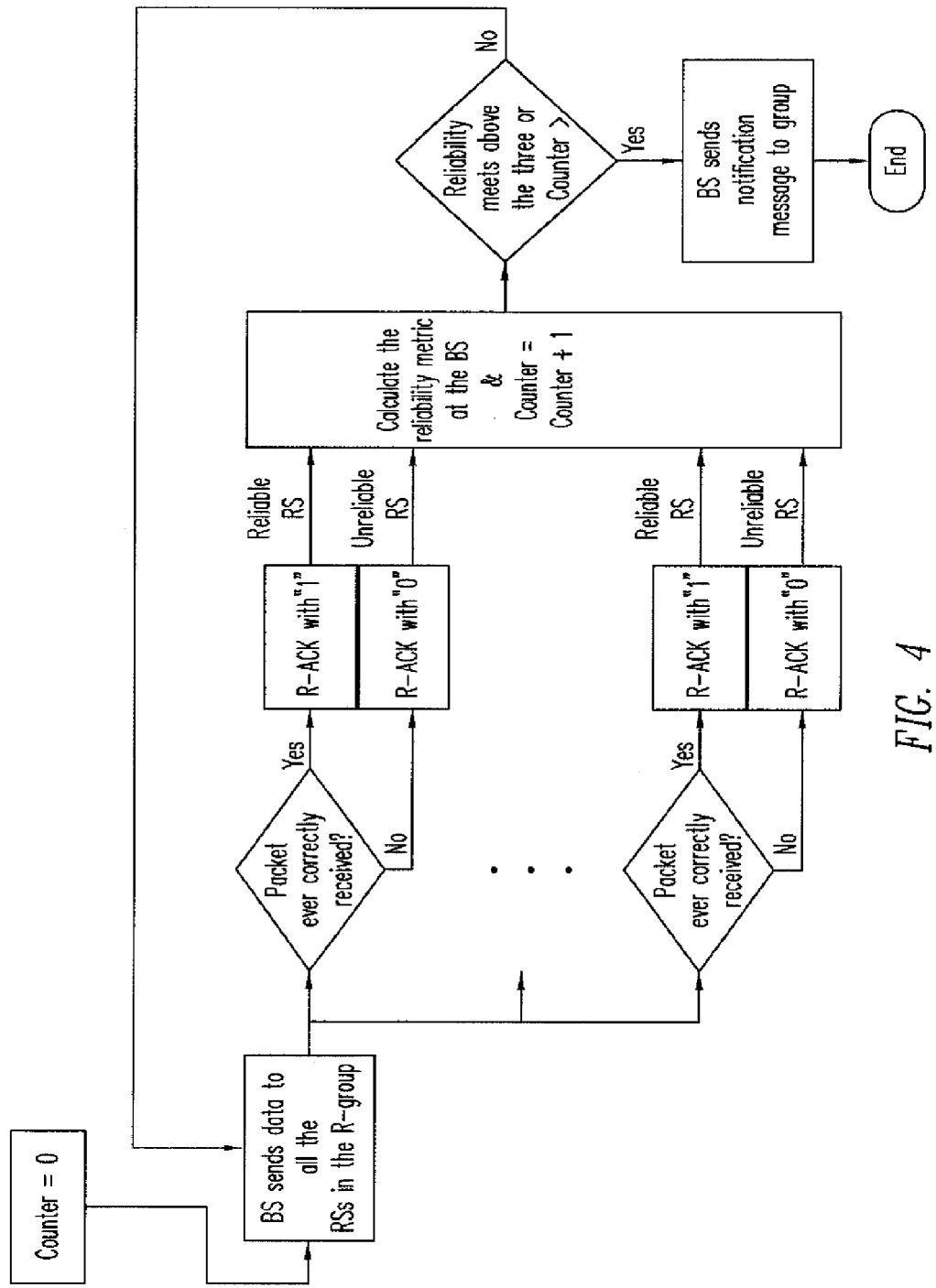
FIG. 4 shows flow chart 400 of a reliable relay-associated transmission scheme, in accordance with a second embodiment of the present invention.

FIG. 2 illustrates, generally, how an R-group is constituted, according to one embodiment of the present invention. As shown in FIG. 4, the target MS sends a preamble during an initial ranging or periodic ranging process (step 201). When an RS detects the preamble, the RS determines whether or not the MS is within its defined coverage area, according to the channel conditions between it and the MS (step 202). The RS then reports to the BS whether or not the MS is in the RS's coverage area (step 203). From these reports, the BS constitutes the R-group (step 204).

Figure 3:
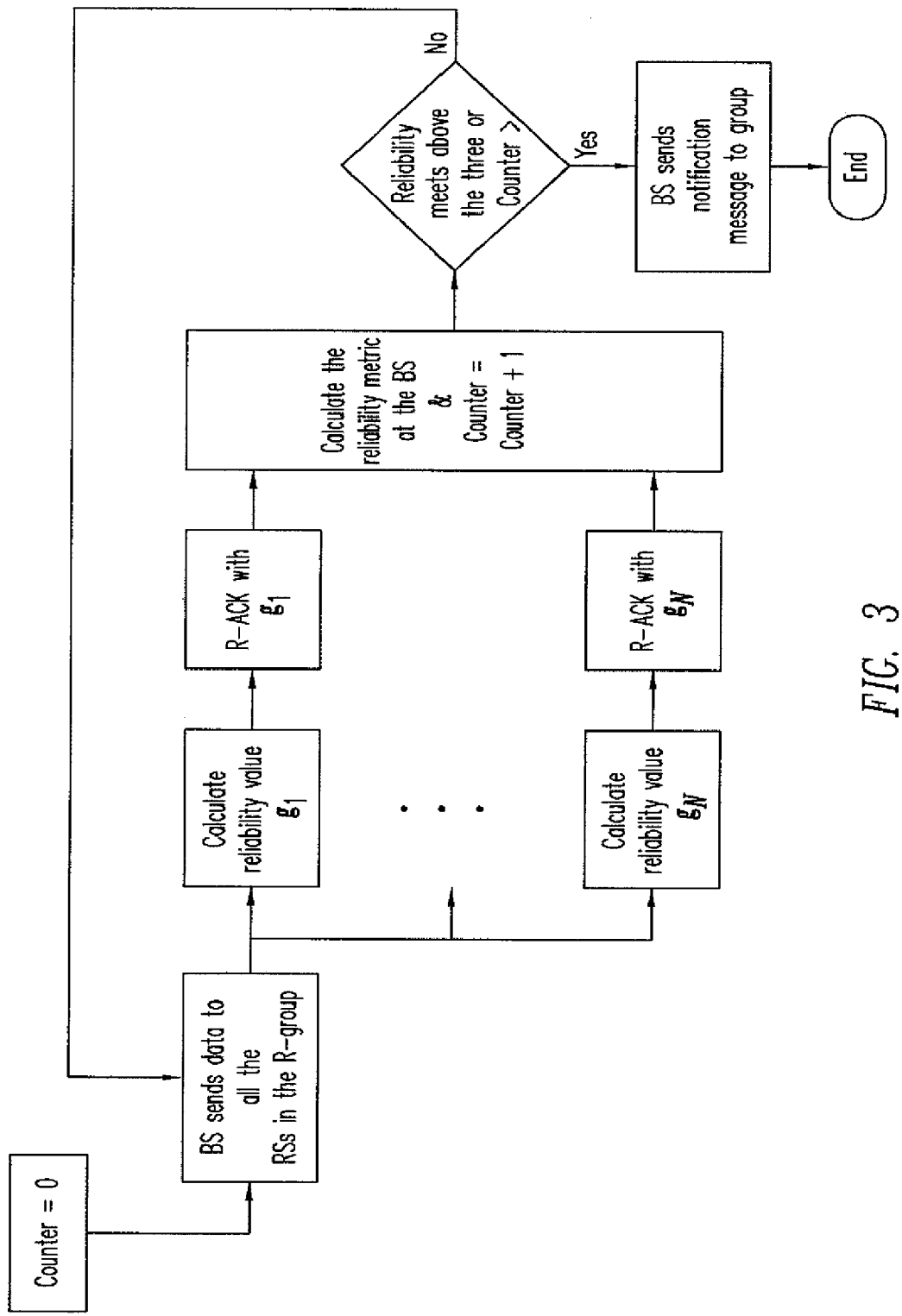
FIG. 3 shows flow chart 300 of a reliable relay-associated transmission scheme, in accordance with one embodiment of the present invention.

According to one embodiment of the present invention, a reliable relay-associated transmission scheme provides fast recovery and reduces the burden of a BS. FIG. 3 shows flow chart 300, which summarizes this reliable relay-associated transmission scheme. As shown in FIG. 3, the BS initializes a counter (step 301) and sends data packets to all the RSs in an R-group using multicast or unicast mode (step 302). These data packets may include data or simply probes which identify the reliability of the RSs. In either unicast or multicast mode, the identification of the target MS is included in the data packets. After receiving the data packets from a BS, each RS calculates its own reliability value (steps 303-1 to 303-N). This reliability value is obtained using a reliability function, which is a function of (a) the channel condition between the BS and this specific RS, (b) the channel condition between this specific RS and the target MS, and (c) the current load at the RS.

The RSs in the R-group then send back to the BS their reliability values (steps 304-1 to 304-N), using R-ACK. Depending on the reliability function, an R-ACK may be similar to a channel state indicator or a conventional acknowledgement (ACK) message. After the BS receives all or some of the R-ACKs from the RSs in the R-group, the BS calculates a reliability metric for the R-group and increase the counter value by one unit (step 305), which is then compared to a predetermined threshold value and check the counter value with the predetermined retransmission limit (step 306). If the calculated metric equals or exceeds the pre-defined threshold value, the BS considers the R-group a reliable R-group and sends a notification message to the R-group (step 307), so that this R-group can transmit received packets to the target MS using a cooperative schemes. However, if the calculated metric is less than the pre-defined threshold value, the BS considers the R-group an unreliable R-group and retransmits the packets to the R-group (i.e., returns to step 302), until either the reliability metric is no less than the pre-defined threshold value or the number of retransmissions exceeds a predetermined retransmission limit.

The number of retransmissions is kept track by a counter, so as to limit the retransmissions between the BS and the RSs to a predetermined limit. It is not required that all RSs in a reliable R-group be reliable. Therefore, some RSs are referred to as reliable RSs, according to their respective reliability values. Examples of reliability functions at the RSs, the reliability metric at the BS and the process for deciding the reliable RSs are next described.

Let $h_{BS-RS_n}$ and $h_{RS_n-MS}$ denote the channel condition between the BS and $RS_n$, the channel condition between the $RS_n$ and the target MS, respectively. Generally, the channel conditions $h_{BS-RS_n}$ and $h_{RS_n-MS}$ may be referred to as the channel power gain. $h_{BS-RS_n}$ may be updated for each packet received at $RS_n$ while $h_{RS_n-MS}$ may be updated during a periodical ranging process. The reliability function and the load factor at $RS_n$ are denoted as $g_n$ and $l_n$ respectively. Let r denote the reliability metric at the BS. The load factor $l_n$ at $RS_n$ is the number of MSs currently in the serving list of $RS_n$. Let $L_n$ denote the maximum load factor at $RS_n$. Several reliability functions and their corresponding reliability values and reliable RSs are defined as follows:

1) One reliability function based on the weakest link and load factor is:

$$g_n = \begin{cases} \min(h_{BS-RS_n}, h_{RS_n-MS}), & l_n < L_n \\ 0 & \text{otherwise,} \end{cases} \quad (1)$$

and the corresponding reliability metric is:

$$r = \sum_{n=1}^{N} g_n. \quad (2)$$

$RS_n$ in the R-group is considered reliable if $g_n > 0$, and unreliable, otherwise.

2) Another reliability function based on the harmonic mean of the per-link throughputs[1] and load factor is:

[1] See, e.g., the article "End-to-end throughput metrics for QoS management in 802.16j MR systems", by O. Oyman, S. Sandhu, and N. Himayat, published in IEEE C802.16j-06/202, November 2006, Dallas, Tex.

$$g_n = \begin{cases} \dfrac{h_{BS-RS_n} h_{RS_n-MS}}{h_{BS-RS_n} + h_{RS_n-MS}}, & l_n < L_n \\ 0 & \text{otherwise,} \end{cases} \quad (3)$$

and the corresponding reliability metric is:

$$r = \sum_{n=1}^{N} g_n. \quad (4)$$

$RS_n$ in the R-group is considered reliable if $g_n > 0$, and unreliable, otherwise.

3) Another reliability function is a binary function based on the weakest link and the load factor:

$$g_n = \begin{cases} 1, & l_n < L_n \ \& \ \min(h_{BS-RS_n}, h_{RS_n-MS}) > h \\ 0 & \text{otherwise,} \end{cases} \quad (5)$$

and the corresponding reliability metric is:

$$r = \sum_{n=1}^{N} g_n, \quad (6)$$

where h is a pre-defined threshold value. $RS_n$ in the R-group is considered reliable if $g_n = 1$, and unreliable, otherwise.

4) Another reliability function based on packet loss is:

$$g_n = \begin{cases} 1, & \text{packets correctly received at } RS_n \\ 0 & \text{otherwise,} \end{cases} \quad (7)$$

and the corresponding reliability metric is:

$$r = \sum_{n=1}^{N} g_n. \quad (8)$$

$RS_n$ in the R-group is considered reliable if $g_n > 0$, and unreliable, otherwise.

It may appear that the reliability function is not an explicit function of $h_{BS-RS_n}$ and $h_{RS_n-MS}$. However, because correct reception of packets is determined by channel condition $h_{BS-RS_n}$ because $RS_n$ is included in the R-group only when $h_{RS_n-MS}$ exceeds a predetermined threshold value, the reliability function is an implicit function of both $h_{BS-RS_n}$ and $h_{RS_n-MS}$. $RS_n$ in the R-group is considered reliable if $g_n = 1$, and unreliable, otherwise.

FIG. 4 shows flow chart 400 of a reliable relay-associated transmission scheme, in accordance with a second embodiment of the present invention based on example 4). As shown in FIG. 4, the BS initializes a counter (step 401) and sends data packets to all the RSs in an R-group using multicast or unicast mode (step 402). As in the embodiment of FIG. 3, these data packets may include data or simply probes which identify the reliability of the RSs. In either unicast or multicast mode, the identification of the target MS is included in the data packets. After receiving the data packets from a BS, each RS determines whether or not the received data packet has ever been correctly received (steps 403-1 to 403-N).

The RSs in the R-group then send back to the BS their decisions on whether or not the data packet has ever been correctly received (steps 404-1 to 404-N), using an R-ACK. Depending on their respective decision, the R-ACK may specify that it is a reliable RS ('1') or an unreliable RS ('0'). After the BS receives all or some of the R-ACKs from the RSs in the R-group, the BS calculates a reliability metric for the R-group and increase the counter value by one unit (step 405), which is then compared to a predetermined threshold value and check the counter value with the predetermined retransmission limit (step 406). If the calculated metric equals or exceeds the pre-defined threshold value, the BS considers the R-group a reliable R-group and sends a notification message to the R-group (step 407), so that this R-group can transmit received packets to the target MS using a cooperative scheme. However, if the calculated metric is less than the pre-defined threshold value, the BS considers the R-group an unreliable R-group and retransmits the packets to the R-group (i.e., returns to step 402), until either the reliability metric is no less than the pre-defined threshold value or the number of retransmissions exceeds a predetermined retransmission limit.

Figure 5:
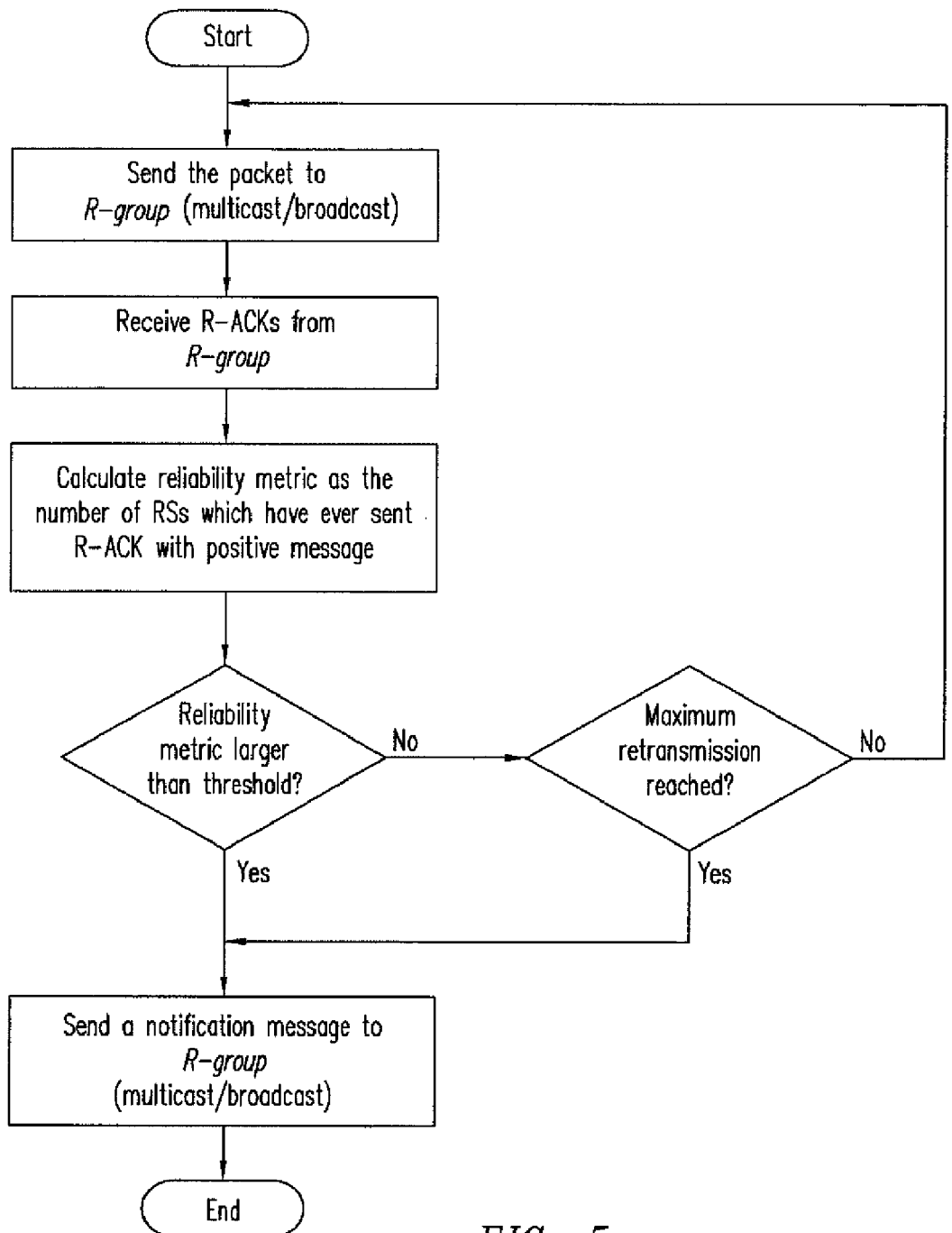
FIG. 5 is a flow chart illustrating the operations of the BS during the process of constituting the R-group under the method illustrated in either FIG. 3 or FIG. 4.

FIG. 5 is a flow chart illustrating the operations of the BS during the process of constituting the R-group under the method illustrated in either FIG. 3 or FIG. 4. FIG. 5 further shows, at step 507, that the number of attempts to constitute a reliable R-group is limited by a predetermined number of retransmissions.

Figure 6:
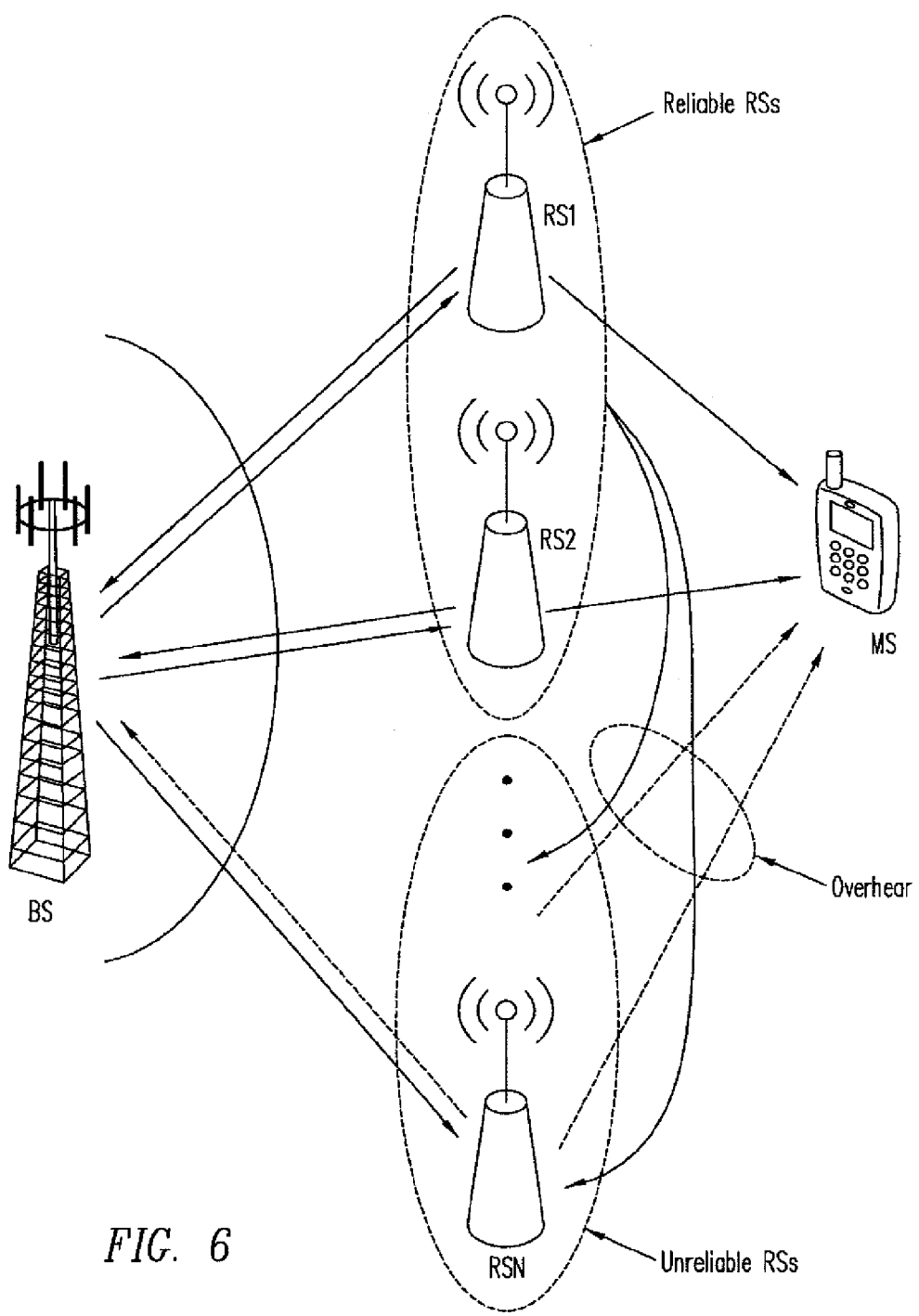
FIG. 6 summarizes the relationships between the BS, the reliable RSs, the unreliable RSs, and the MS under the opportunistic cooperative transmission scheme.

After constituting the reliable R-group using any one of the above methods, an opportunistic cooperative transmission scheme may be used to transmit data between the R-group and the target MS. The opportunistic cooperative transmission scheme for packet transmission can be implemented as follows:

Step 1): The reliable RSs in the R-group cooperatively transmit a packet to the MS using a "cooperative multicast transmission mode" under a distributed space-time coding[2] or a repetition coding scheme. Cooperative multicast transmission allows the unreliable RSs in the R-group to overhear transmissions between the reliable RSs and the MS. These unreliable RSs become "overheard reliable RSs" or "overheard unreliable RSs", depending on whether or not the overheard packets are received correctly. Here, the cooperative multicast transmission mode is a cooperative transmission mode in which the multicast group consists of both the R-group and the target MS. FIG. 6 summarizes the relationships between the BS, the reliable RSs, the unreliable RSs, and the MS under the opportunistic cooperative transmission scheme.

[2] An example of a distributed space-time coding is disclosed in U.S. patent application Ser. No. 11/754,903, entitled "Method and Apparatus for Distributed Space-time Coding for the Downlink of Wireless Radio Networks," by H. Papadopoulos, filed on May 29, 2007 ("Papadopoulos").

Step 2): When the MS receives a data packet from one or more of the reliable RSs, a "cooperative acknowledgement message" ("C-ACK") or a "cooperative negative acknowledgement message" ("C-NACK") is sent back to the R-group, based on whether or not the data packet is correctly received. Unlike a conventional ACK or NACK message in that a C-ACK or C-NACK message, the C-ACK or C-NACK message is transmitted using multicast or broadcast mode to the R-group. If the MS feedbacks a C-ACK message, the transmission for the data packet is complete. Otherwise (i.e., the MS indicates by a C-NACK message that it is unable to receive the reliable information from a reliable RS), step 3) below is carried out.

Step 3): Both the reliable RSs and the overheard reliable RSs that have correctly received the C-NACK message become "connecting RSs." The connecting RSs cooperatively transmit the overheard information to the target MS under the cooperative multicast transmission mode. The overheard unreliable RSs also overhear the transmission between the connecting RSs and the MS and may become overheard reliable RSs, if they receive the overheard packet correctly. After the MS receives a data packet from the connecting RSs, the MS multicasts or broadcasts a C-ACK or C-NACK message, depending on whether or not the MS receives the data packet correctly or not. If the MS provides a C-ACK packet, then the transmission is successfully completed. Otherwise, step 3) is repeated until the target MS provides a C-ACK message or the number of retransmissions between the R-group and the target MS reach a predetermined limit.

Figure 7A:
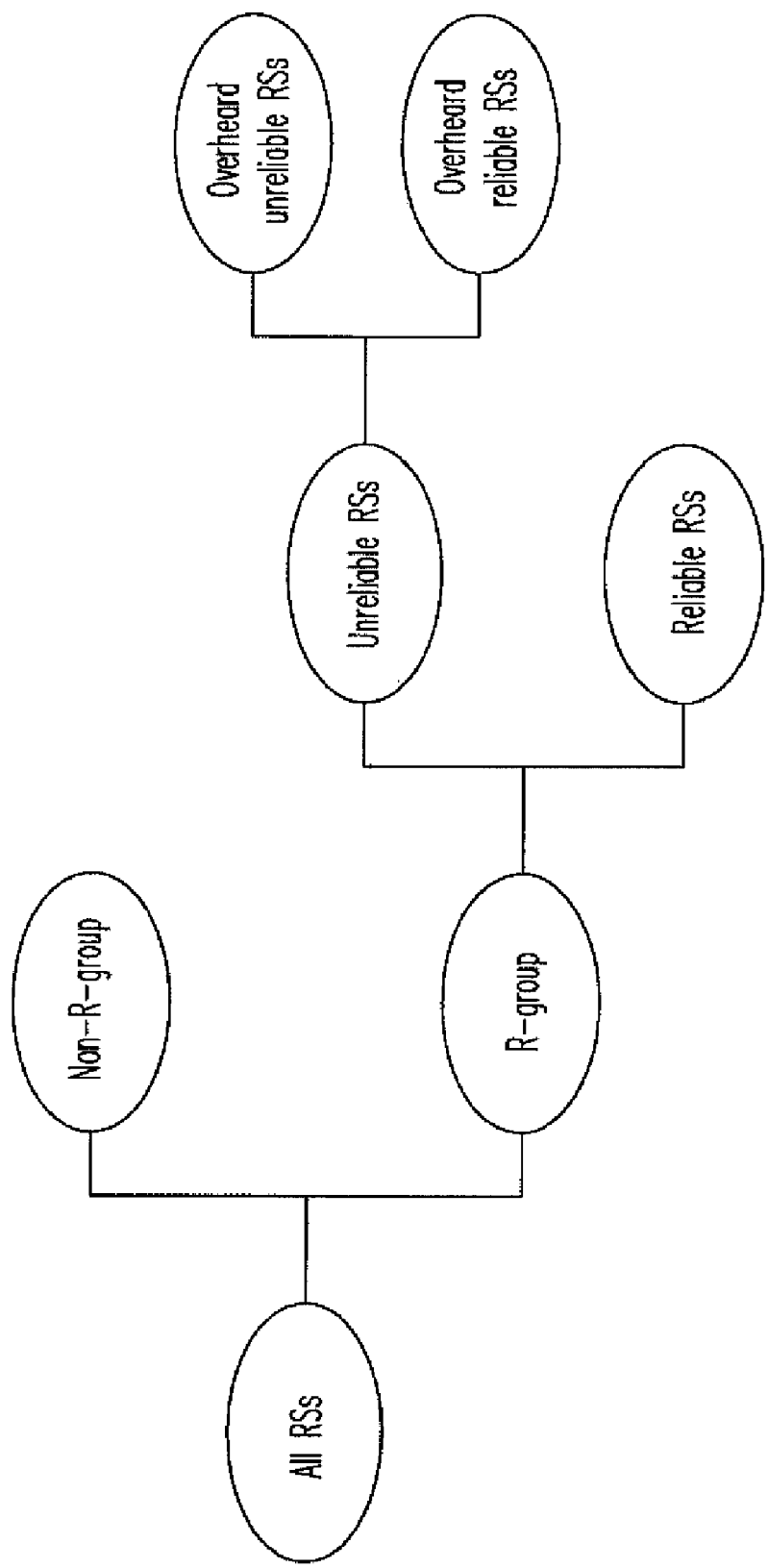
FIG. 7(a) shows the relationship among the classifications of RSs, according to one embodiment of the present invention.

Non-connecting RSs are either the reliable RSs or overheard reliable RSs which receive the C-NACK incorrectly from the target MS. An RS can be an overheard reliable RS and a connecting RS at different times, as these labels are dynamically changing. For example, an unreliable RS can also overhear the transmission between the MS and a connecting RS (which may be an overheard reliable RSs). The relationship among all these categories of RSs are summarized in FIGS. 7(a) and 7(b). FIG. 7(a) shows that the group of all RSs (701) include the R-group (703) and the group of RSs outside of the R-group ("non-R-group; 702). Within the R-group, an RS may belong to the group of reliable RSs (705) and the group of unreliable RSs (704), which is further subdivided into the group of overhead unreliable RSs (706) and the group of overheard reliable RSs (707).

Figure 7B:
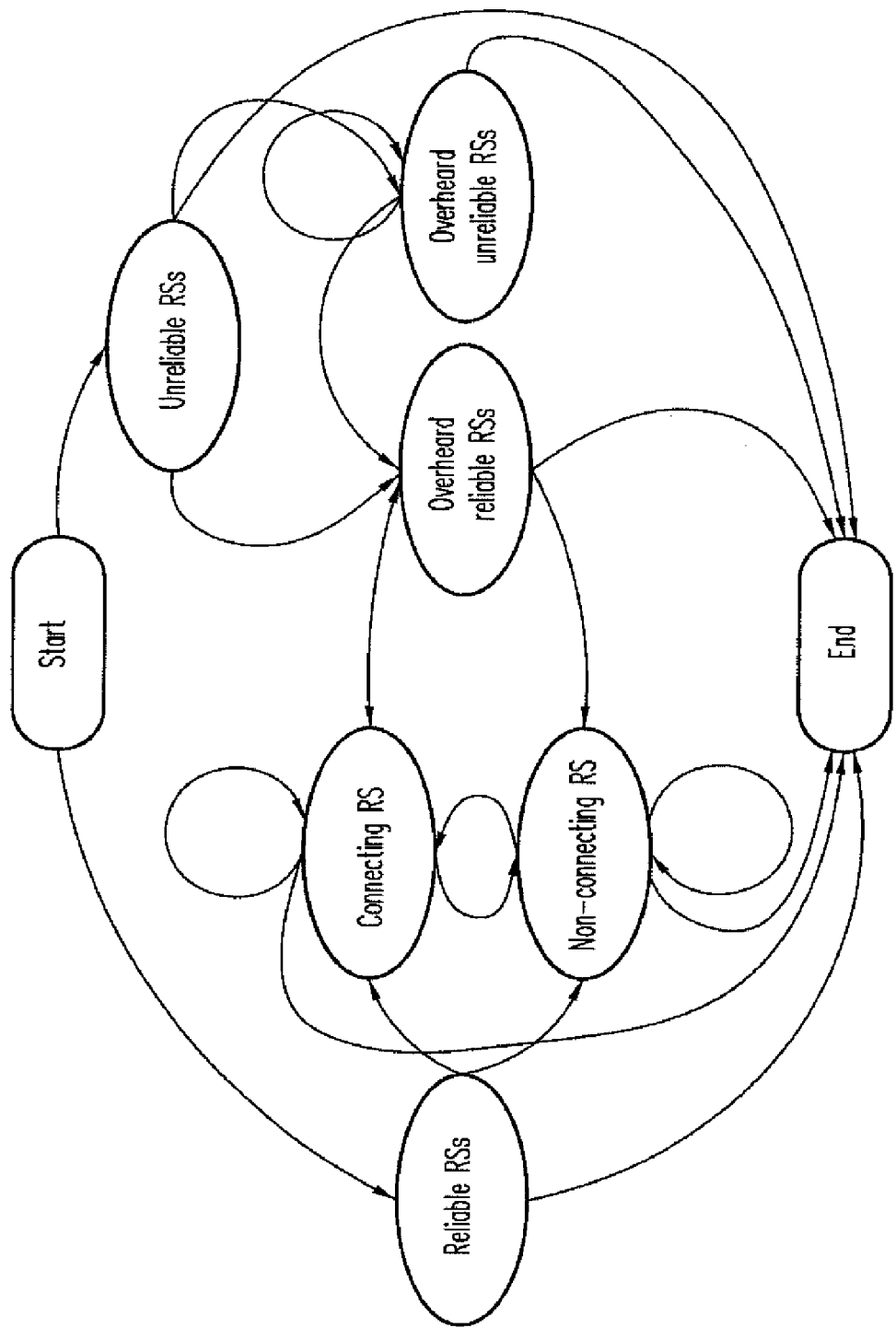
FIG. 7(b) is a state diagram showing how the roles of an RS may change in the course of a packet transmission, in accordance with one embodiment of the present invention.

FIG. 7(b) is a state diagram showing how the roles of an RS may change in the course of a packet transmission, in accordance with one embodiment of the present invention. As shown in FIG. 7(b), an RS may become a reliable RS (705) or an unreliable RS (704), depending on the channel conditions between it and the BS. A reliable RS can become a connecting RS (708) or a non-connecting RS (709), depending on the channel conditions between it and the MS. Similarly, an unreliable RS may become an overheard reliable RS (706) or an overheard unreliable RS (707), depending upon the channel conditions between it and the MS and between it and the reliable RSs. A connecting RS may become a non-connecting RS. An overheard reliable RS may become a connecting RS, a non-connecting RS or an overheard unreliable RS. An overheard unreliable RS may become an overheard reliable RS.

Using a suitable scheme for cooperative transmission (e.g., distributed space-time coding), the MS needs not be notified of the number of RSs that is involved in the cooperation, nor are the unreliable RSs required to send ACK/NACK messages to other RSs about whether or not the overheard packet is correctly received.

Figure 8A:
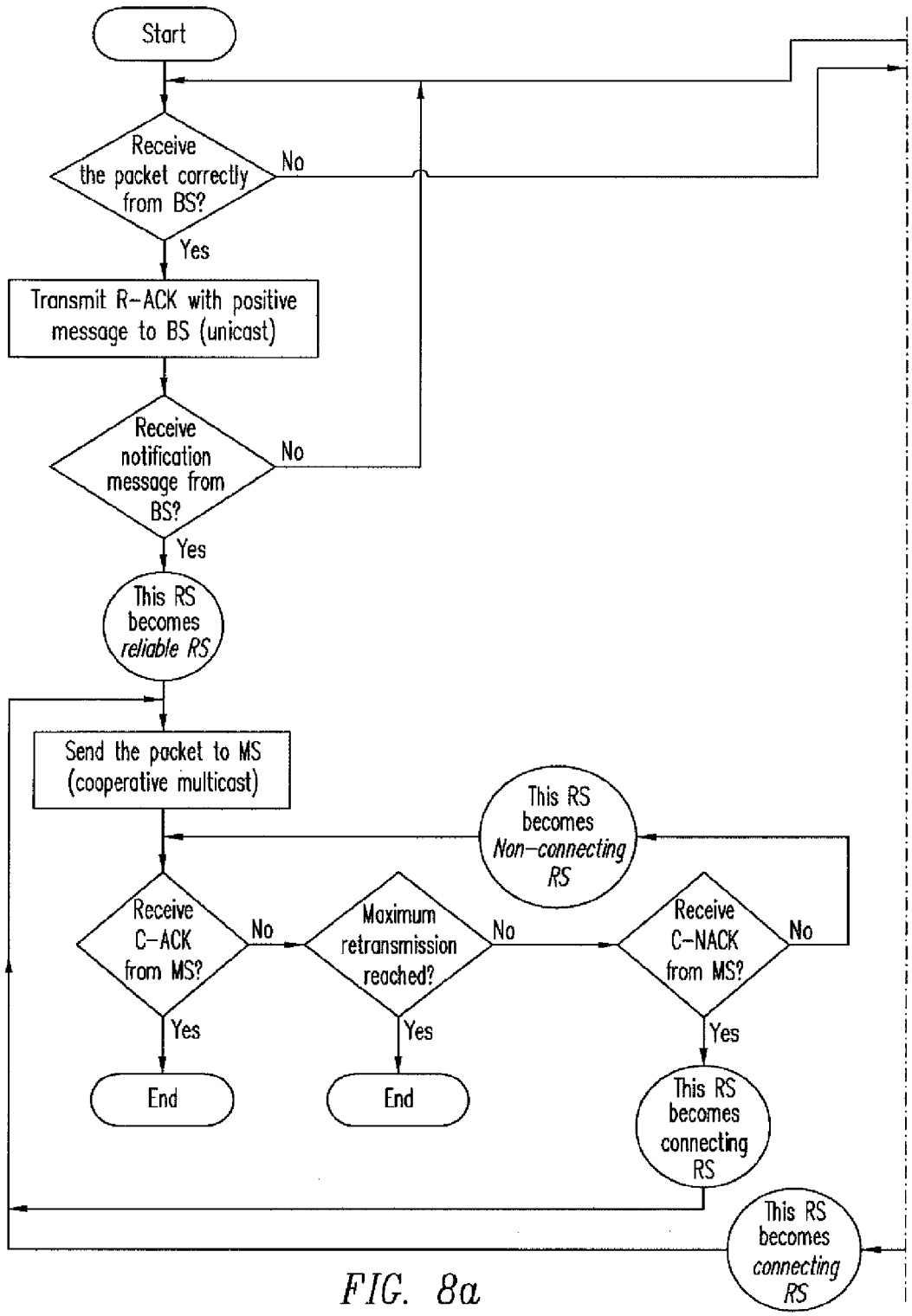
FIG. 8 shows a flow chart illustrating an operation of an RS, in accordance with one embodiment of the present invention.
Figure 8B:
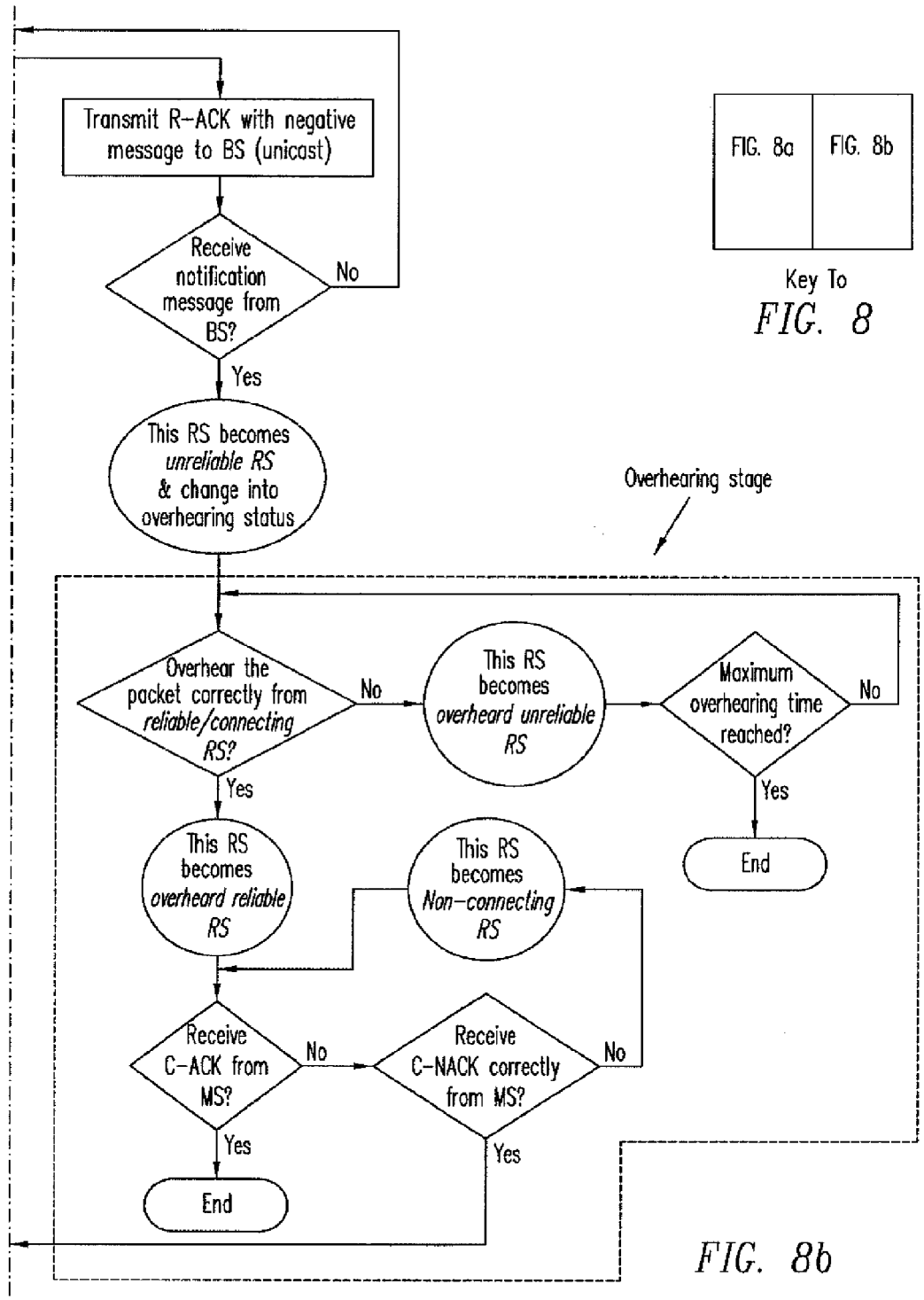

FIG. 8 shows a flow chart illustrating an operation of an RS, in accordance with one embodiment of the present invention. As shown in FIG. 8, initially, an RS determines if it has correctly received a data packet form a BS (801). If the data packet is determined to be correctly received, the RS transmits an R-ACK with a positive message (802) by unicast mode. Otherwise, an R-ACK with a negative message is sent by unicast mode (811). The RS then waits for a notification message from the BS (803, 812). The message from the BS indicates whether the RS is considered a reliable RS (804) or an unreliable BS (813). If no notification is received from the BS after a predetermined time interval, the RS returns to 801. If the RS is a reliable RS, it sends the data packet to the MS using a cooperative multicast scheme (805). Thereafter, if a C-ACK message is received from the MS (806), data transmission to the MS is deemed complete. Otherwise, the RS determines if it has retransmitted the data packet more than a predetermined number of times (807). If it has retransmitted the data packet more than the predetermined number of times, the RS also deems transmission of the data packet to be complete. Otherwise, the RS determines if a C-NACK message is received (808). If the RS has correctly received a C-NACK message, the RS has become a non-connecting RS (809), and remains so until a C-ACK message (806) is received. Otherwise, the RS has become a connecting RS, and returns to receiving data packets from the BS (801).

For an unreliable RS (813), the RS determines if it can correctly overhear the cooperative multicast data transmission of the data packet from the reliable or connecting RSs (814). Depending on whether a correct transmission is overheard, the RS becomes an overheard reliable RS (815) or an overheard unreliable RS (819). For an overheard unreliable RS, if a correct transmission is not heard within a predetermined maximum number of retransmissions (820), data transmission for the data packet is complete. For an overheard reliable RS, the RS determines if it has received a C-ACK message from the MS. If so, data transmission for the data packet is deemed complete. Otherwise, the RS determines if it has received a C-NACK message from the MS (817). If so, the RS becomes a connecting RS (818) and participates in the cooperative multicast transmission at 805. Otherwise, the RS becomes a non-connecting RS and waits for C-ACK messages at 816.

Figure 9:
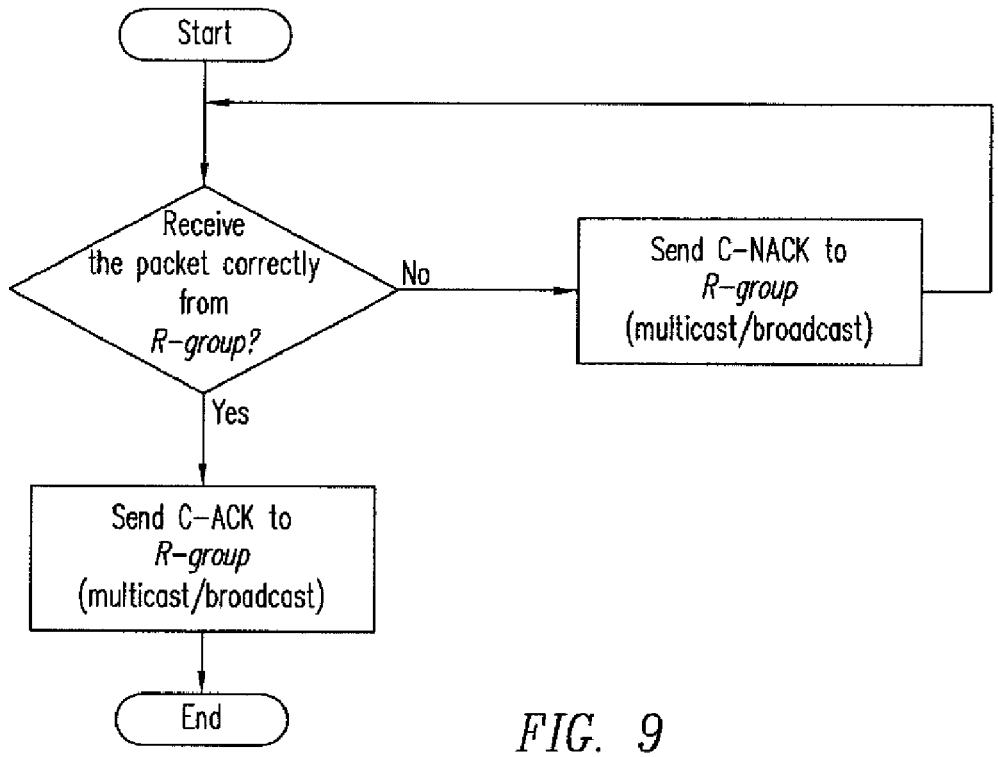
FIG. 9 shows a flow chart illustrating an operation of an MS, in accordance with one embodiment of the present invention.

FIG. 9 shows a flow chart illustrating an operation of an MS, in accordance with one embodiment of the present invention. As shown in FIG. 9, initially, the MS determines if it has received a data packet correctly from any member of the R-group (901). If so, it sends a C-ACK message to the R-group using multicast or broadcast mode (902) and the data packet transmission is deemed complete. Otherwise, if sends a C-NACK message to the R-group using multicast or broadcast mode (903), and waits for the next transmission of the data packet at 901.

Figure 10:
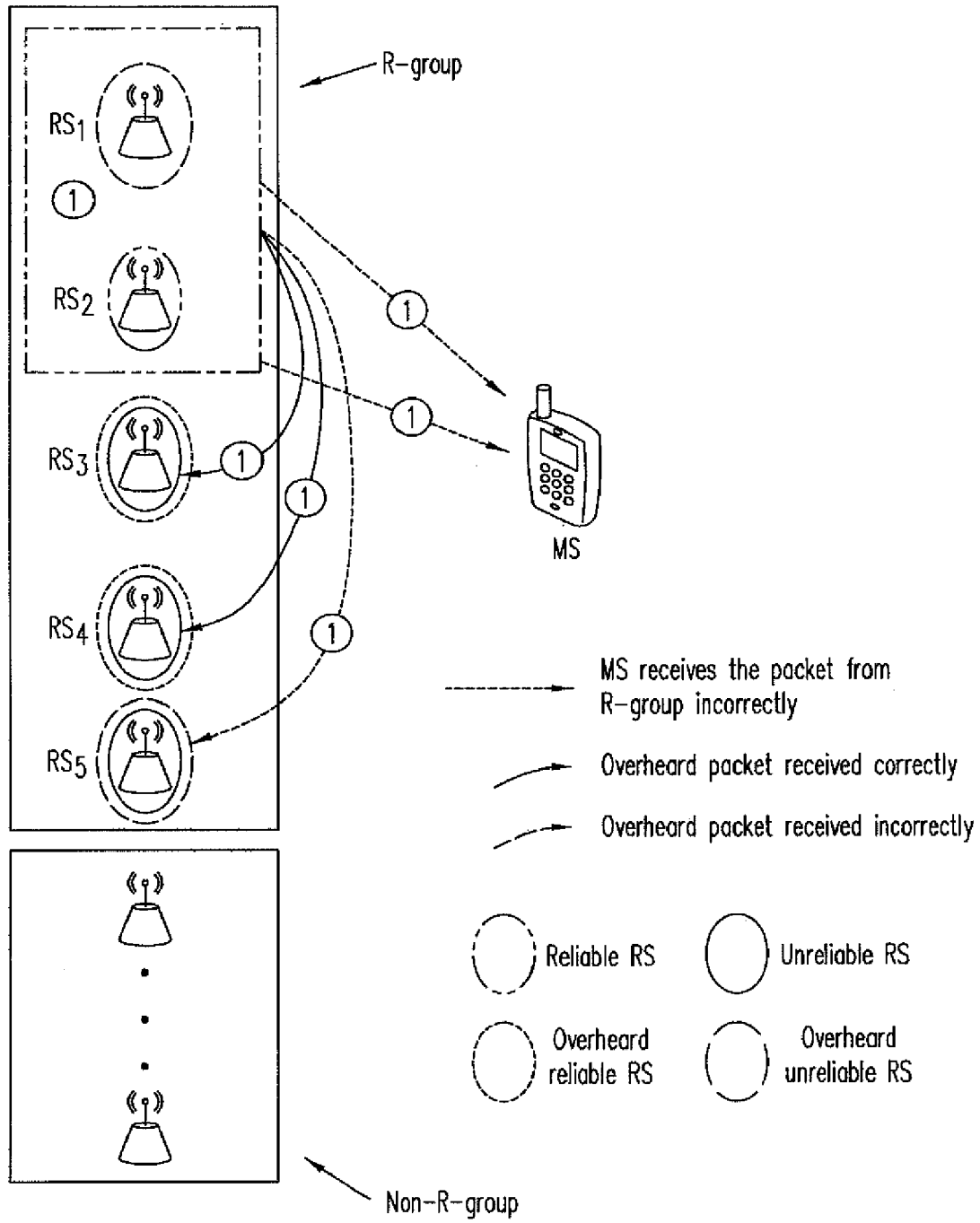
FIG. 10 illustrates step 1) in an example in which reliable RSs send a packet to the target MS, which is overheard by unreliable RSs.

FIGS. 10-13 illustrate an example including steps 1-4, respectively, in which reliable RSs send a packet to the target MS, which is overheard by unreliable RSs. In FIGS. 10-13, all the RSs are divided into R-group and Non-R-group during initial ranging or periodical ranging process. As shown in FIG. 10, $RS_1$, $RS_2$, $RS_3$, $RS_4$, $RS_5$ belong to R-group. Using any of the methods for constituting an R-group, $RS_1$ and $RS_2$ are considered reliable RSs, while $RS_3$, $RS_4$ and $RS_5$ are considered unreliable RSs.

In FIGS. 10-13, the following steps are illustrated:
Step 1) As shown in FIG. 10, reliable RSs (i.e., $RS_1$ and $RS_2$) send a packet to the MS via cooperative multicast transmission mode using a distributed space-time coding (e.g., the distributed space-time coding explained in Papadopoulos). Under the cooperative multicast transmission mode, the MS receives the data packet, while the transmission is overheard by the unreliable RSs (i.e., $RS_3$, $RS_4$ and $RS_5$). However, as only $RS_3$ and $RS_4$ decode the overheard packet correctly, as explained above, $RS_3$ and $RS_4$ become overheard reliable RSs and $RS_5$ becomes overheard unreliable RS.

Figure 11:
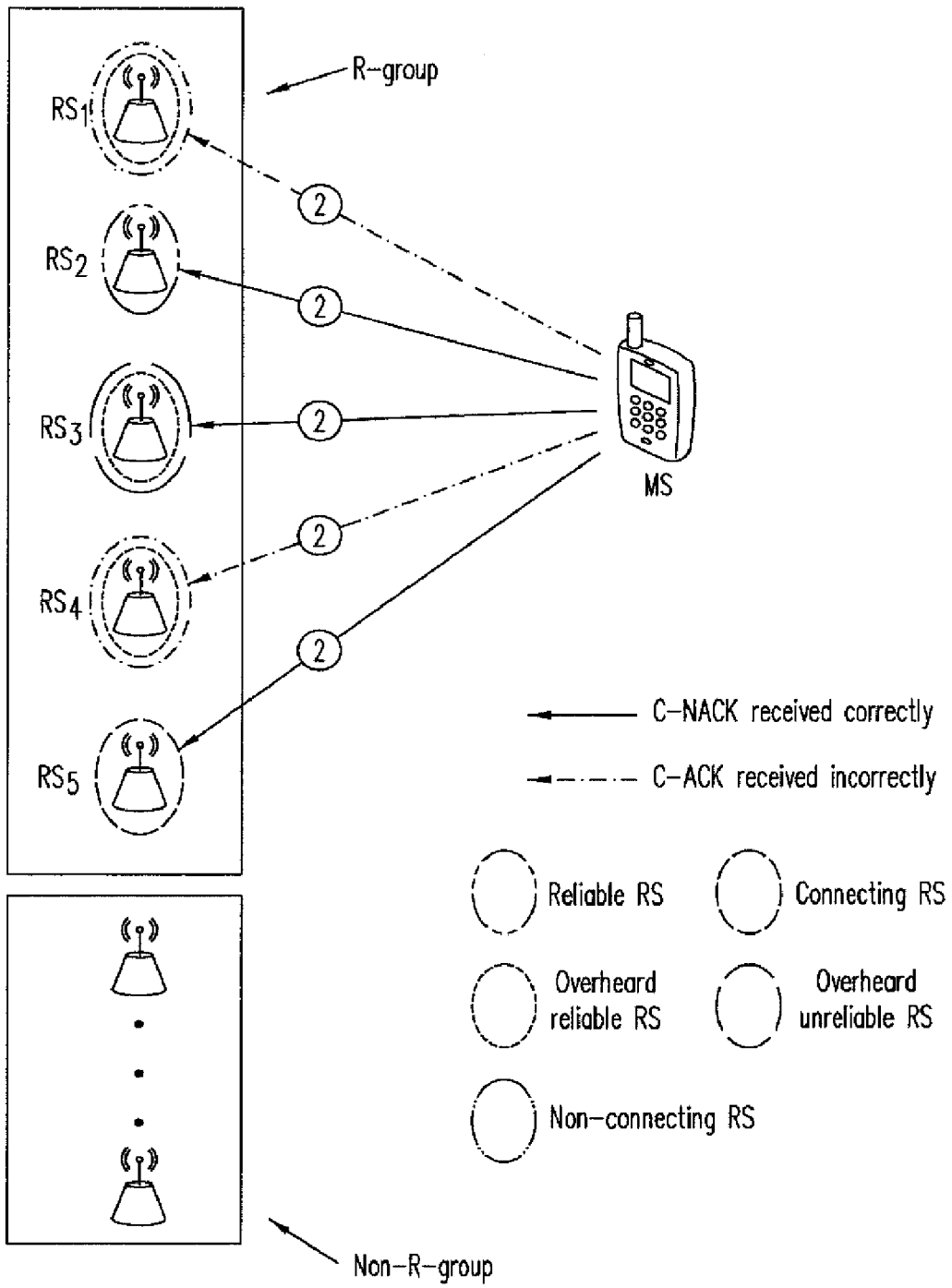
FIG. 11 illustrates step 2) in an example in which reliable RSs send a packet to the target MS, which is overheard by unreliable RSs.

Step 2) As shown in FIG. 11, the MS sends back a C-NACK message to R-group using multicast or broadcast mode, since the MS does not decode the received packet from step 1) correctly. As $RS_2$ and $RS_3$ receive the C-NACK message correctly, $RS_2$ and $RS_3$ become connecting RSs. However, $RS_1$ and $RS_4$ do not receive the C-NACK message correctly. Therefore, $RS_1$ and $RS_4$ are considered to have temporally lost connection with the MS. For $RS_5$, since it does not have the packet (i.e., did not overheard the transmission from the connecting RSs), $RS_5$ does not take any action, even though it receives the C-NACK message correctly (as shown in FIG. 11).

Figure 12:
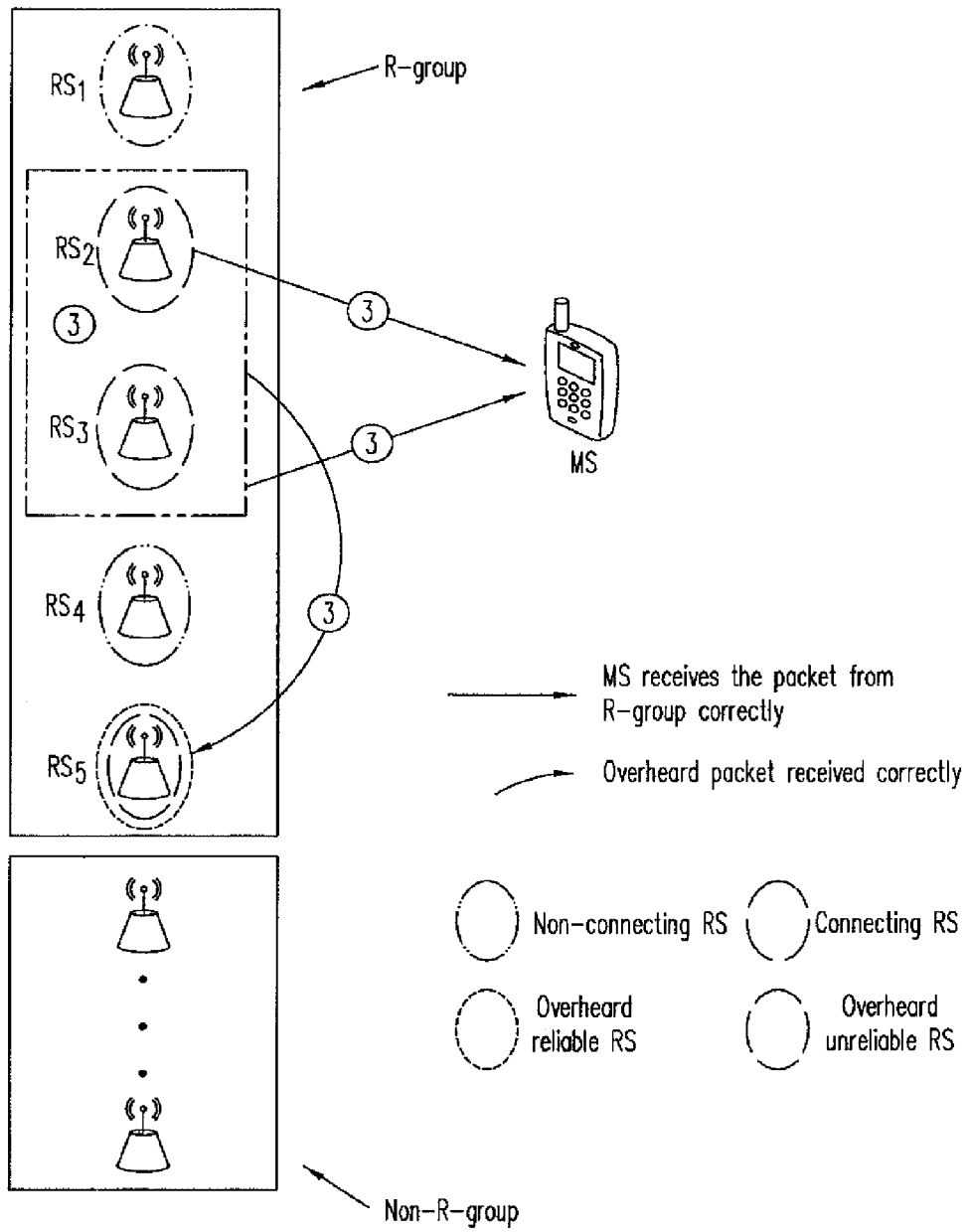
FIG. 12 illustrates step 3) in an example in which reliable RSs send a packet to the target MS, which is overheard by unreliable RSs.

Step 3) As shown in FIG. 12, connecting RSs (i.e., $RS_2$ and $RS_3$) send the packet to the MS via cooperative multicast transmission mode and the transmission is overheard correctly by overheard unreliable $RS_5$.

Figure 13:
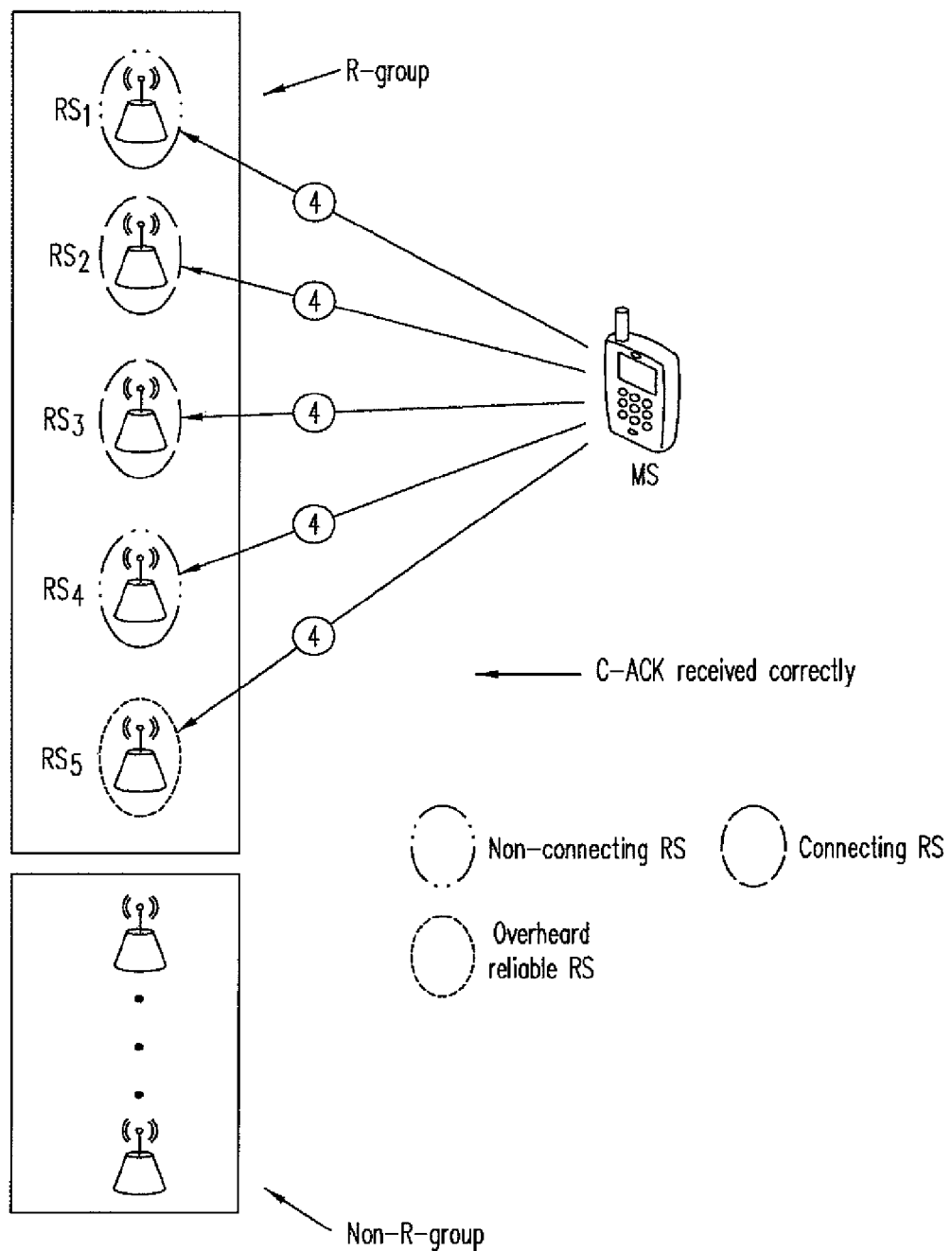
FIG. 13 illustrates step 4) in an example in which reliable RSs send a packet to the target MS, which is overheard by unreliable RSs.

Step 4) As shown in FIG. 13: The MS sends back a C-ACK message to the R-group, since it decodes the received packet from step 3) correctly.

FIGS. 14-17 provide an example of the present invention using the reliability metrics of example 4) above, illustrated by two RSs (i.e., an R-group consisting of two RSs). In this example, the threshold for the reliability metric is set as "1" (i.e., as long as there is one RS decoding the packet correctly, the BS does not retransmit a data packet to the R-group).

Figure 14:
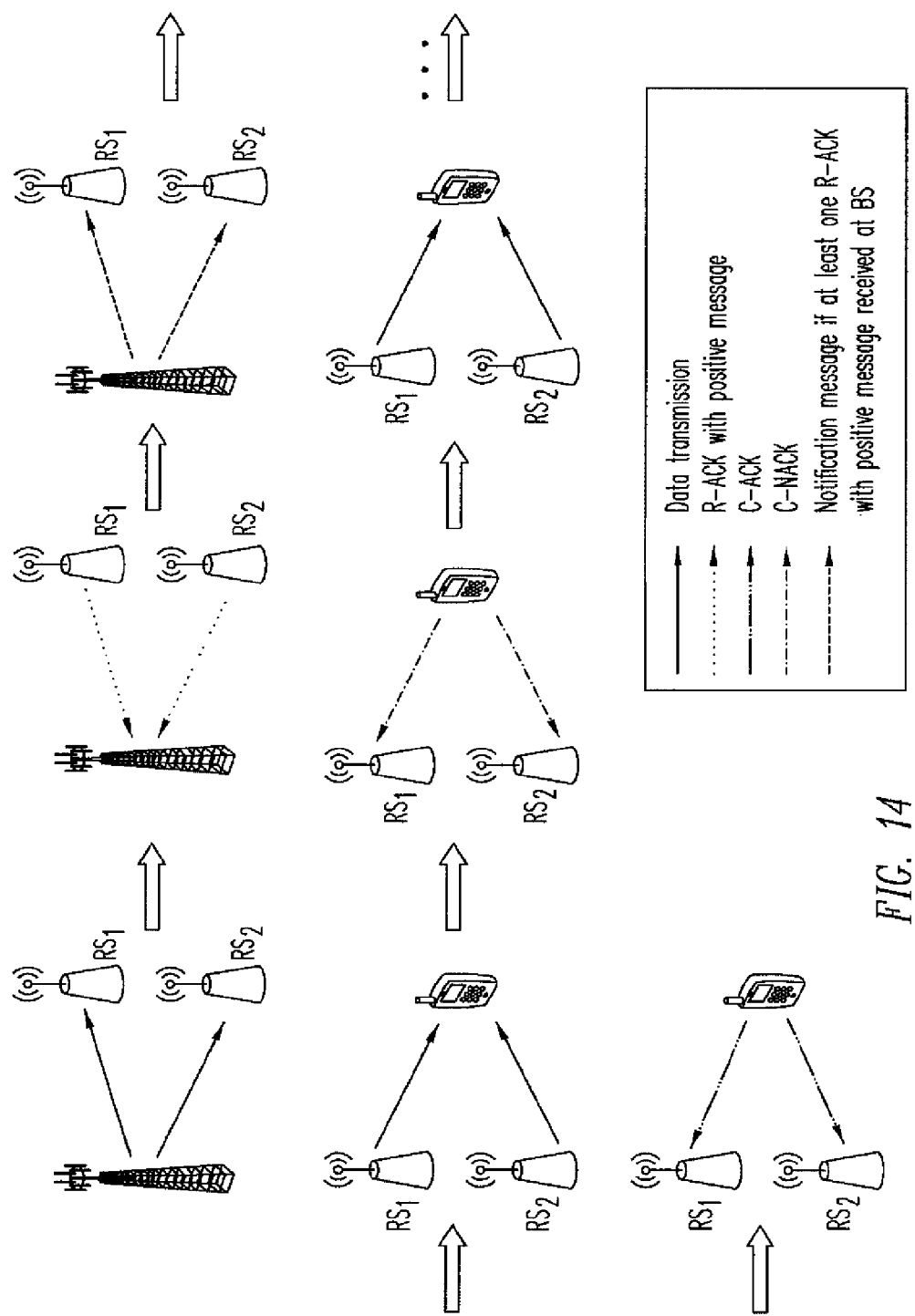
FIG. 14 shows both RSs of a two-RS system becoming reliable RSs after the first transmission from the BS, in accordance with one embodiment of the present invention.

FIG. 14 shows both RSs becoming reliable RSs after the first transmission from the BS, such that both RSs cooperatively transmit to the MS. As shown in FIG. 14, both RSs decode the packet from the BS correctly and feedback an R-ACK with a positive message to the BS. Consequently, the BS sends a notification message to both RSs indicating a reliable R-group. Accordingly, both RSs cooperatively transmit the received packet to the MS, using a pre-defined space-time coding (e.g., such as that disclose in Papadopoulos). If the packet received at the MS is not correctly decoded, as illustrated in FIG. 14, the MS sends a C-NACK message to both RSs. Then, instead of retransmitting the packet from the BS, retransmission is provided only between the R-group and the MS (i.e., the RSs cooperatively retransmit to the MS). In this manner, latency is reduced and the BS need not retransmit the packet.

Figure 15:
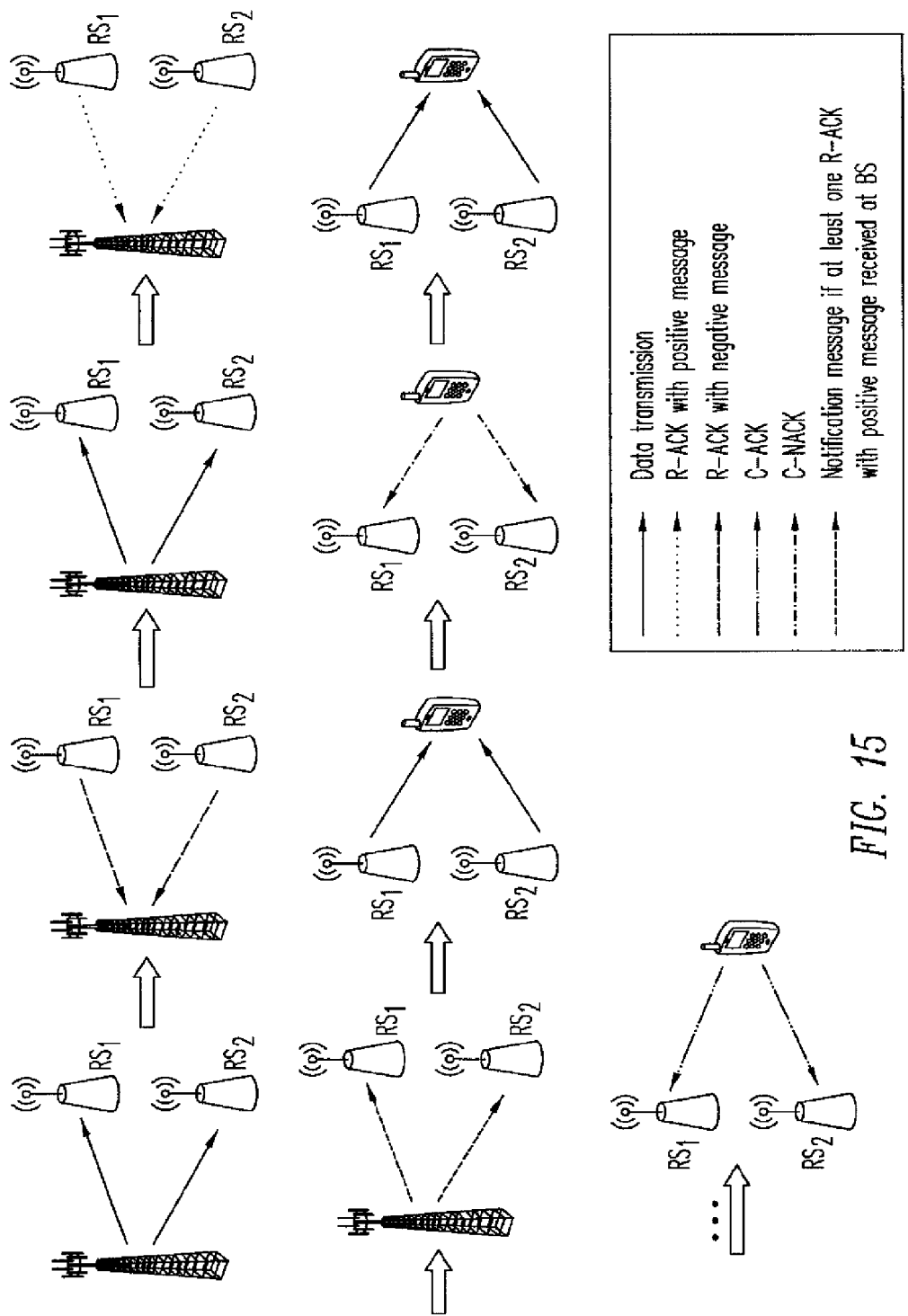
FIG. 15 shows both RSs of a two-RS system decoding incorrectly after the first transmission of a data packet from the BS, in accordance with one embodiment of the present invention.

FIG. 15 shows both RSs decoding the data packet from the BS incorrectly at the first transmission, so that the BS has to retransmit the packet. Upon re-transmission, both RSs receive and decode the packet correctly. Consequently, both RSs send the data packet to the MS in a cooperative manner.

Figure 16:
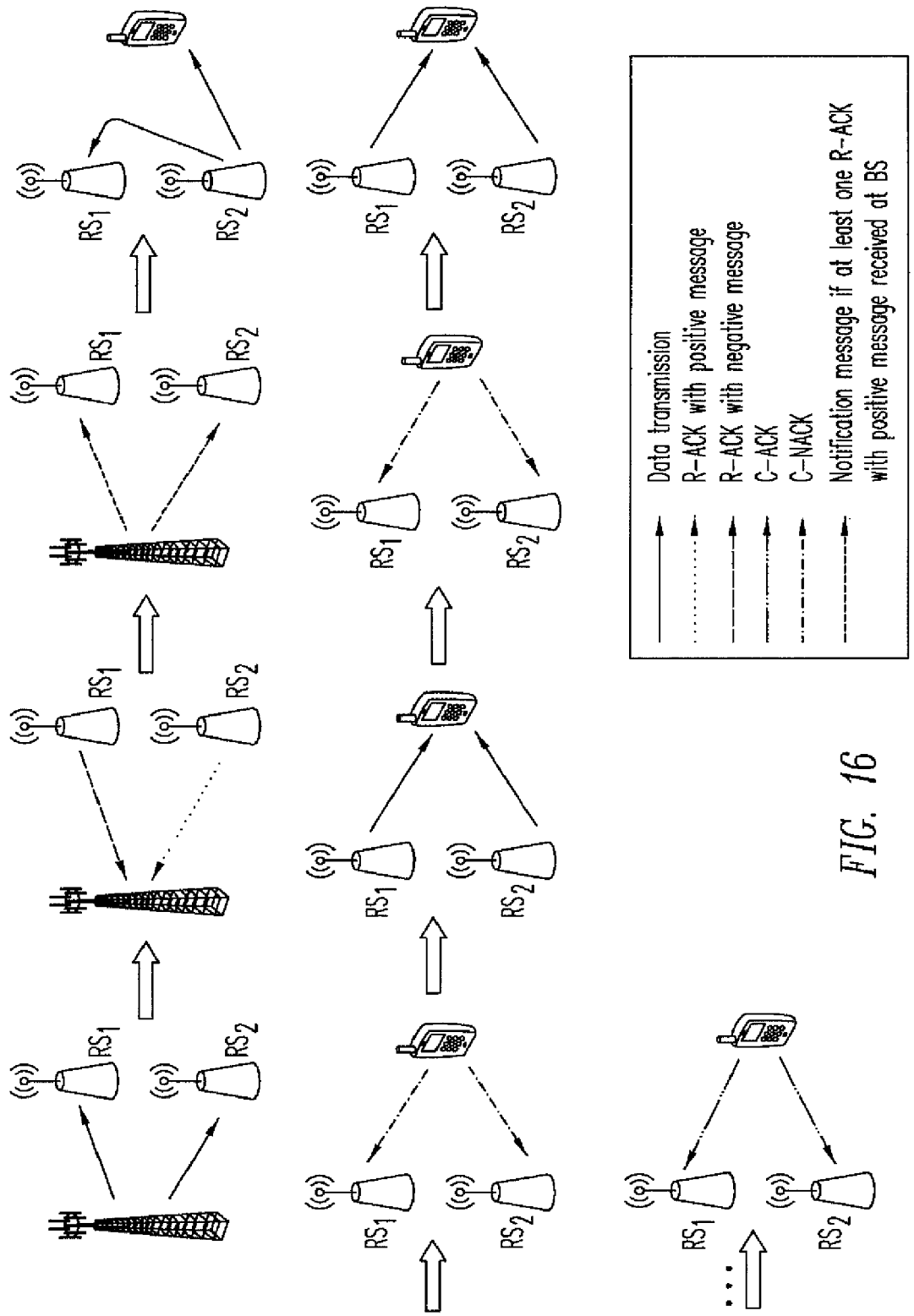
FIG. 16 shows one of the RSs of a two-RS system correctly decoding the data packet after the first transmission from the BS, while the other RS fails to correctly decode the data packet, in accordance with one embodiment of the present invention.

FIG. 16 shows one of the RSs ($RS_2$) decodes the received packet from the BS correctly while the other RS ($RS_1$) does not decode the received packet correctly. Thus, only $RS_2$ becomes a reliable RS which transmits the packet to the MS using cooperative multicast transmission which allows reception by members of the R-group only (i.e., $RS_1$ and the intended MS), unlike a conventional unicast or multicast transmission mode. When $RS_2$ transmits the packet to the MS, the unreliable RS (i.e., $RS_1$) overhear this transmission. Consequently, the MS sends back a C-ACK message or a C-NACK message to the R-group, according to whether or not the RS correctly decodes the data packet. If the MS fails to receive or decode the data packet from the reliable RS (i.e., $RS_2$) at the first transmission to the MS, as illustrated in FIG. 16, $RS_1$ provides the additional cooperative diversity using the overheard information. In this manner, the radio resources of both $RS_1$ and $RS_2$ are utilized.

Figure 17:
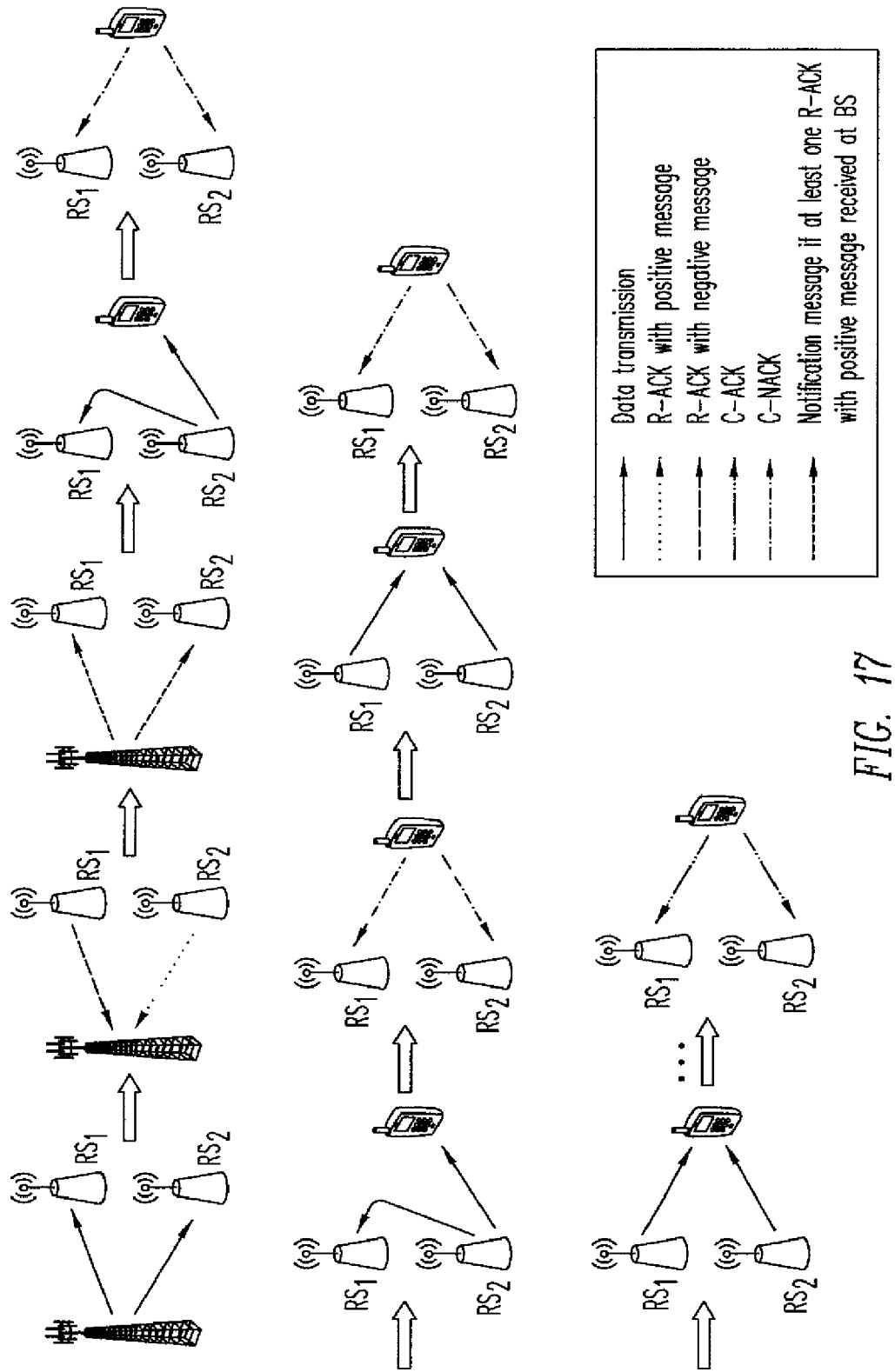
FIG. 17 shows the initial condition of FIG. 16, further in that the MS fails to correctly receive the data message, even though $RS_1$ correctly overhears $RS_2$'s transmission to the MS, in accordance with one embodiment of the present invention.

FIG. 17 shows the initial condition of FIG. 16, further if the MS fails to correctly receive the data message, even though $RS_1$ correctly overhears $RS_2$'s transmission to the MS, in accordance with one embodiment of the present invention. Regardless of whether or not the overheard information received at $RS_1$ is reliable (e.g., the condition illustrated by FIG. 17), $RS_2$ retransmits the packet to the MS independently of $RS_1$. If again, the MS does not decode the received packet from $RS_2$ correctly, and if $RS_1$ correctly overhears the information, $RS_1$ may still cooperate with $RS_2$ to provide cooperative diversity to MS. Here we can see the "opportunistic" (i.e., taking advantage of on channel conditions between the RSs and the BS), the RSs which have good connection (or channel) with the BS become reliable RSs, while unreliable RSs opportunistically become overheard reliable RSs if good connection with the originally reliable RSs can be established.

FIGS. 14-17 show that the BS is released from the retransmission to the R-group once the reliability metric is above a certain threshold, such as illustrated above. Under the methods illustrated under FIGS. 14-17, the unreliable RSs which do not receive correct packet from the BS may overhear the transmissions from the reliable RSs or connecting RSs, to allow more RSs to cooperatively transmit the packet to the MS, thereby providing cooperative diversity and extending the coverage of the BS.

Figure 18:
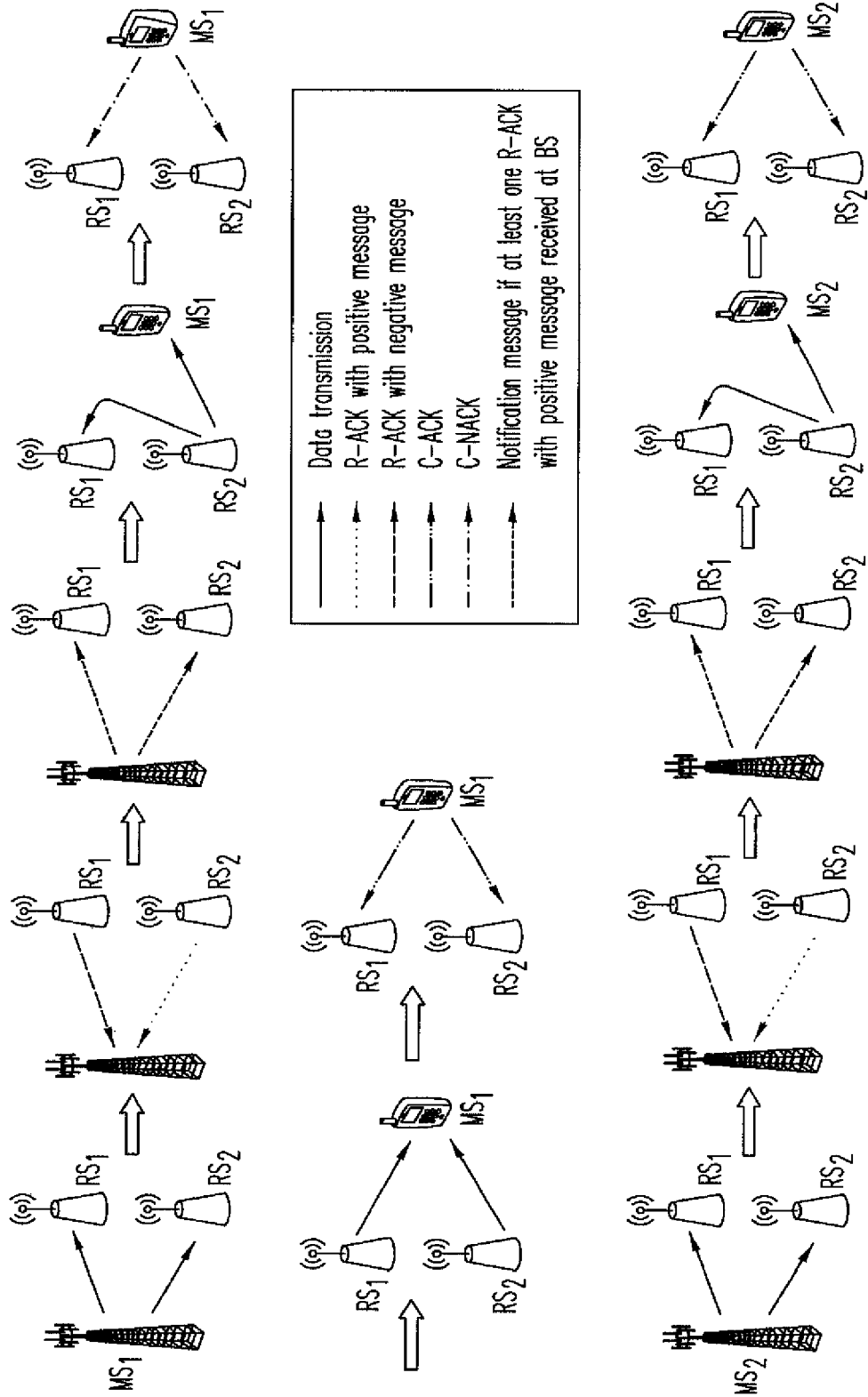
FIG. 18 shows one embodiment based on orthogonal frequency division multiplexing access (OFDMA), between the BS and two MSs via two RSs.
Figure 19A:
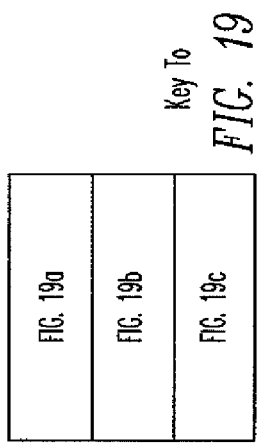
FIG. 19 illustrates a frame structure suitable for use in the embodiment.
Figure 19A:
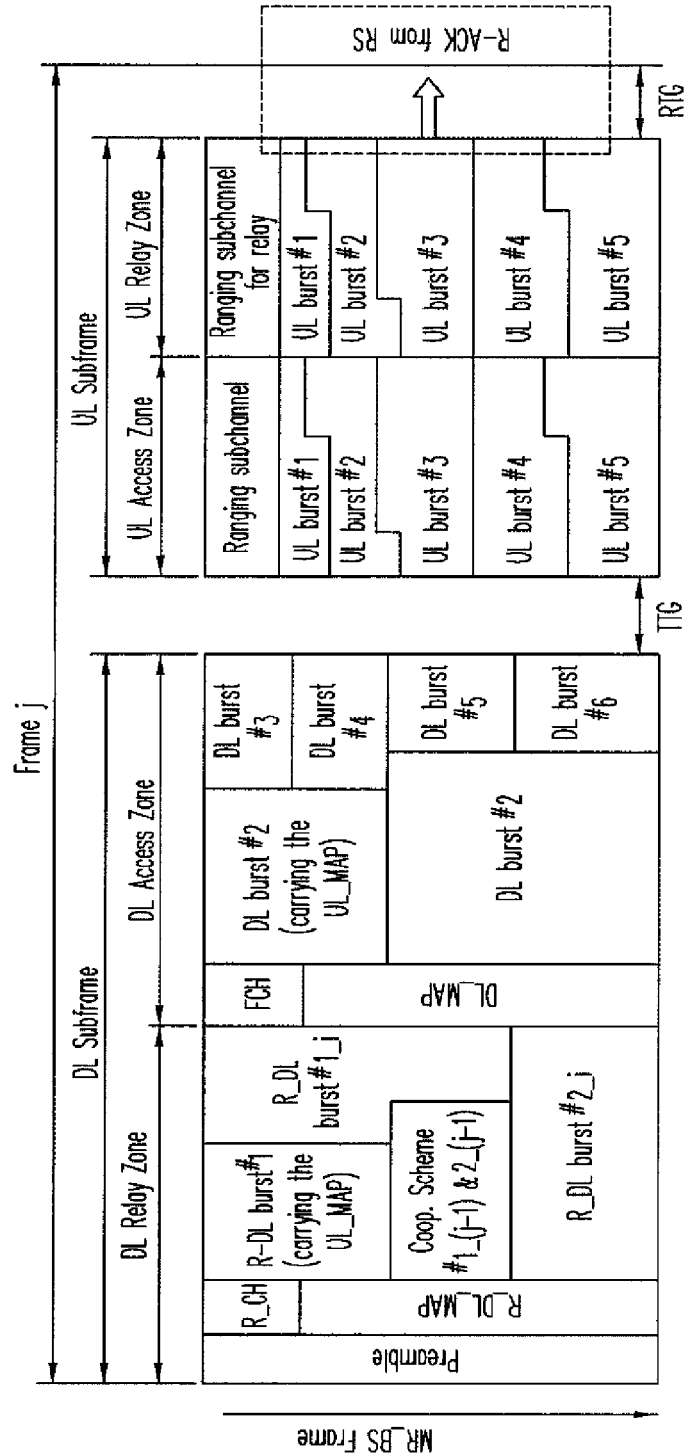
Figure 19B:
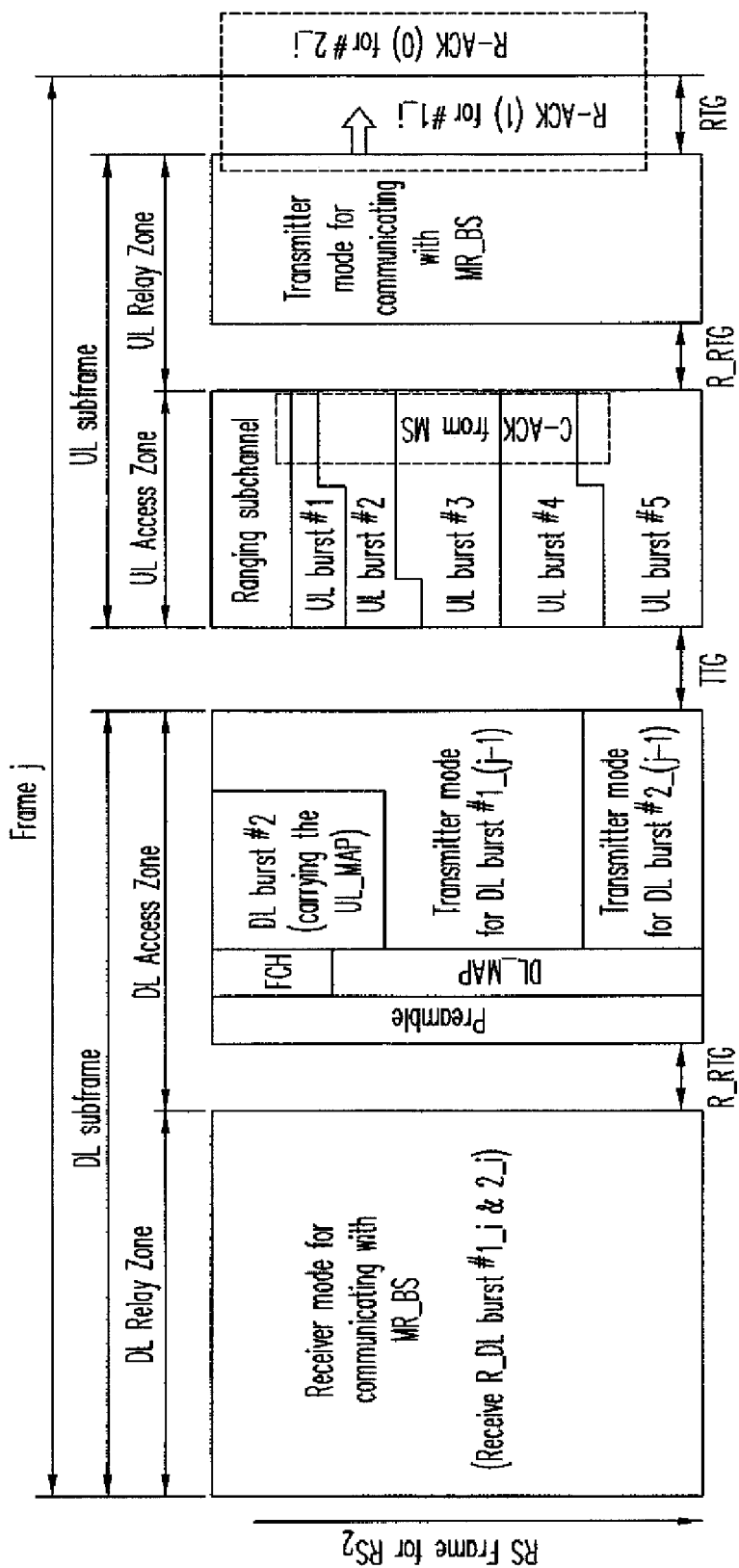
Figure 19C:
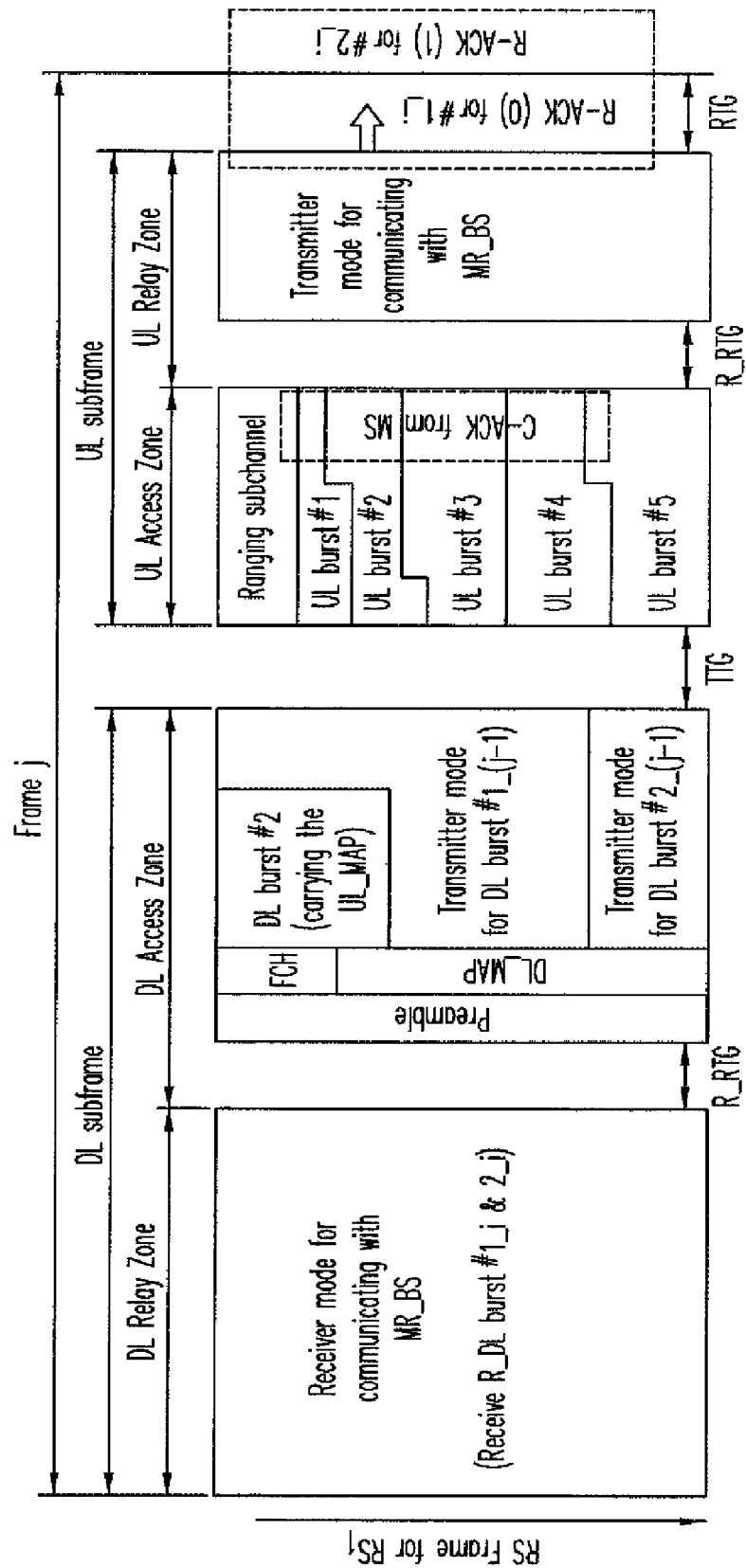
Figure 20A:
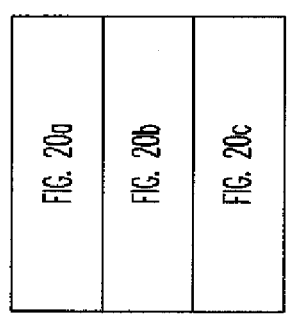
FIG. 20 illustrates a frame structure suitable for use in the embodiment.
Figure 20A:
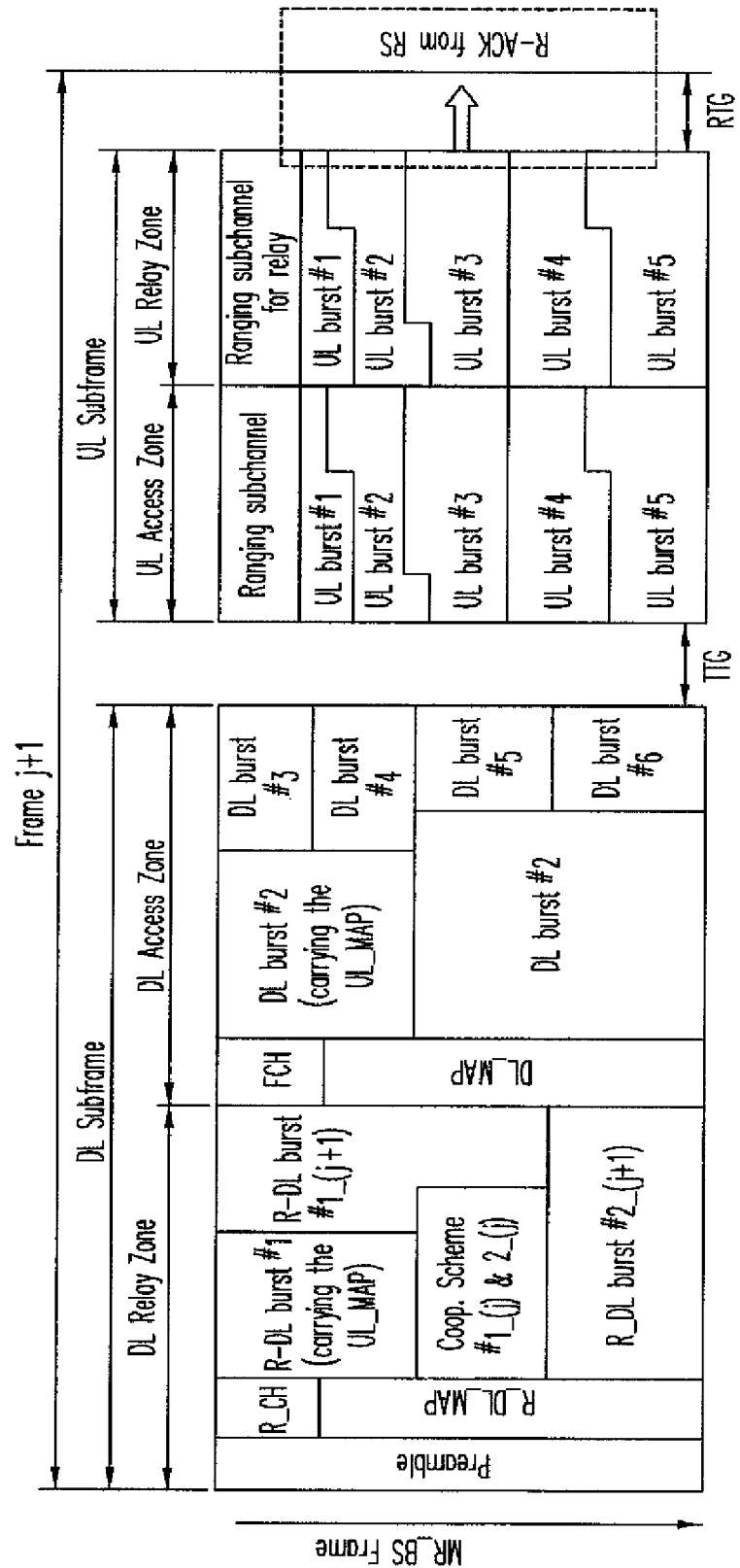
Figure 20B:
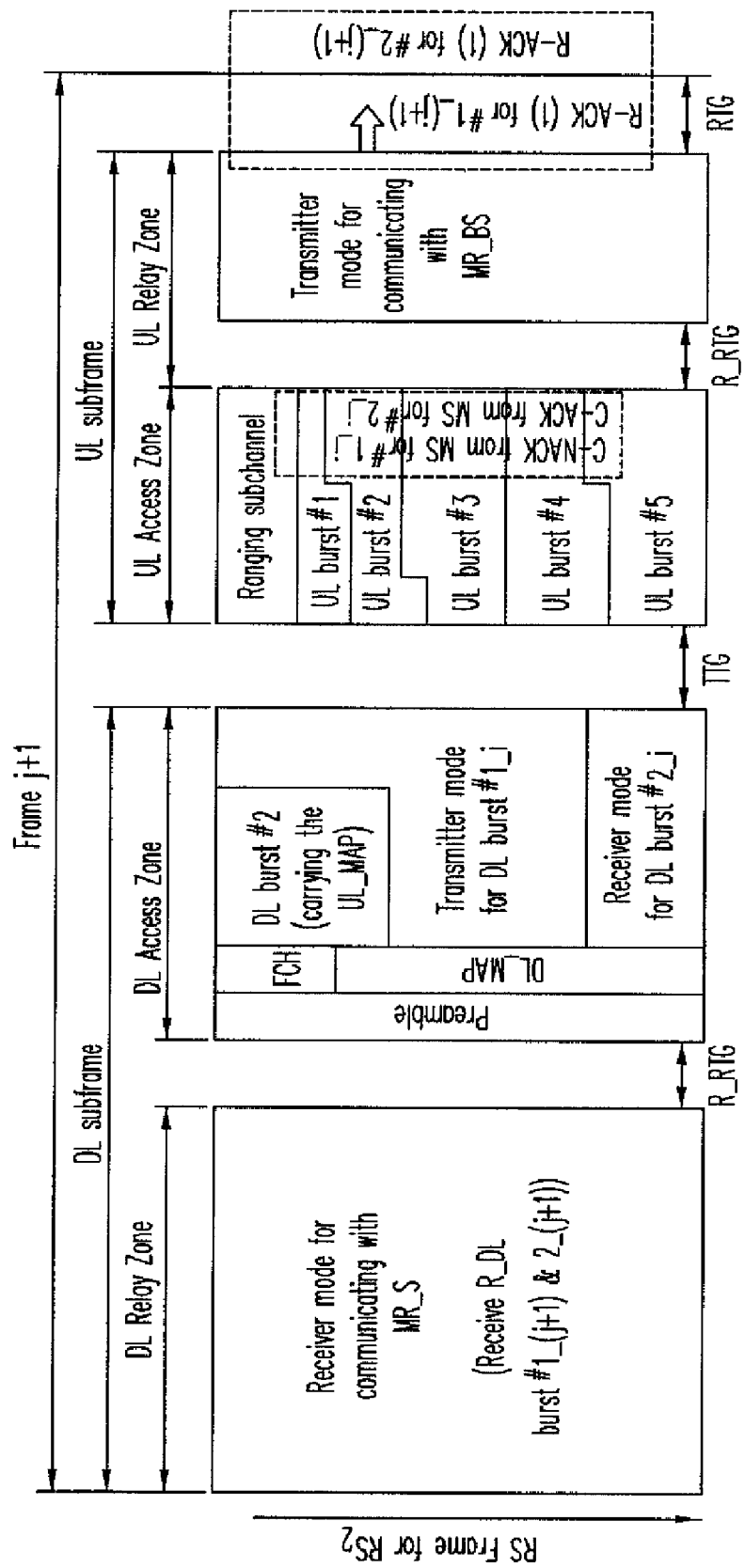
Figure 20C:
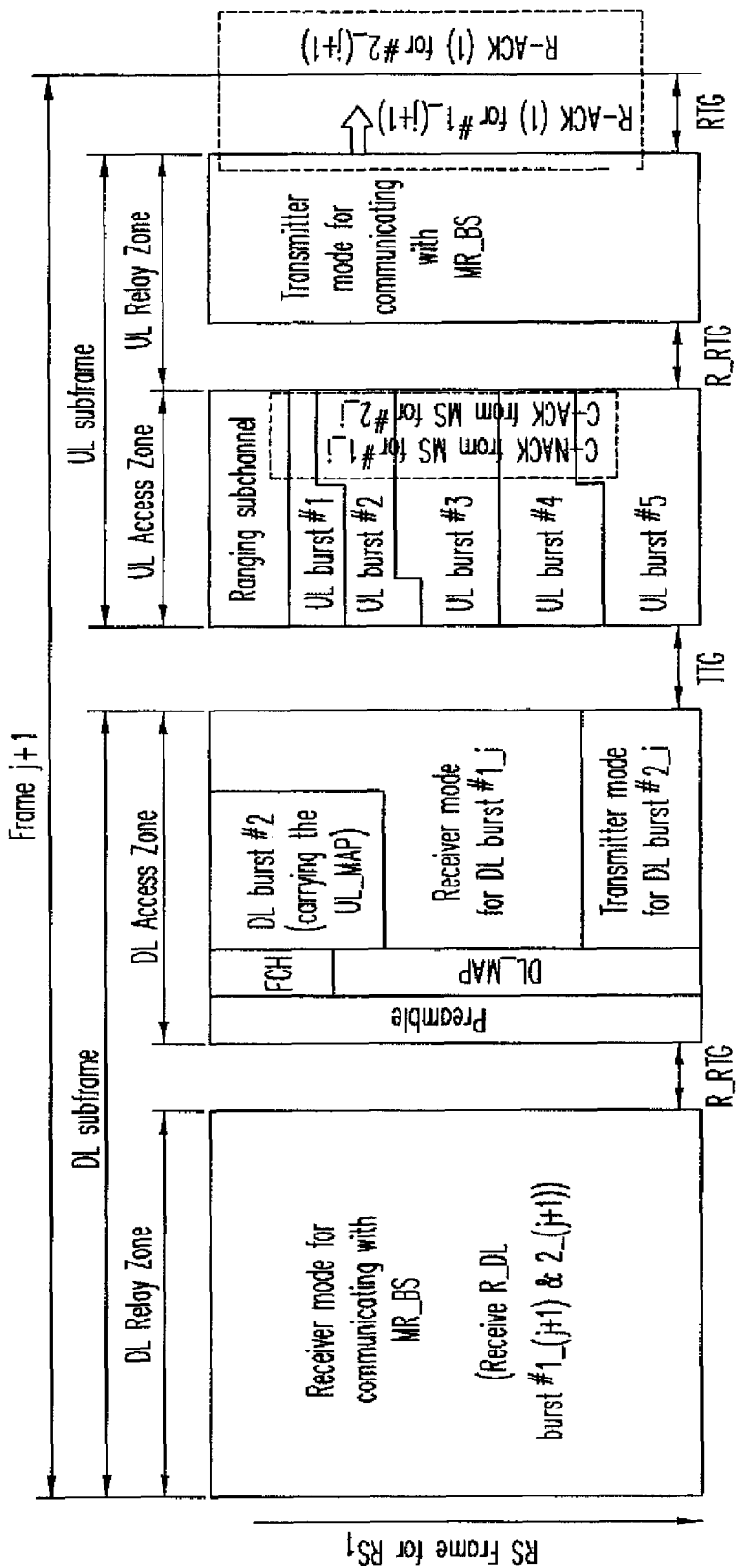

There are various ways to implement methods of the present invention. For example, FIG. 18 shows one embodiment based on orthogonal frequency division multiplexing access (OFDMA), between the BS and two MSs via two RSs. As shown in FIG. 18, ($RS_1$, $RS_2$ and $MS_1$) and ($RS_1$, $RS_2$ and $MS_2$) are two R-groups each using the opportunistic cooperative transmission mode explained above. In FIG. 18, each R-group is allocated a non-overlapping set of frequencies for communication under the OFDMA scheme.

Figure 21:
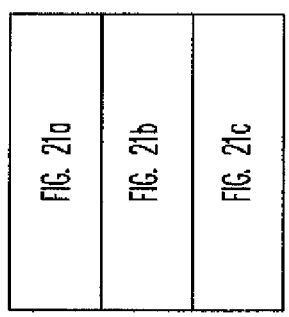
FIG. 21 illustrates a frame structure suitable for use in the embodiment.
Figure 21A:
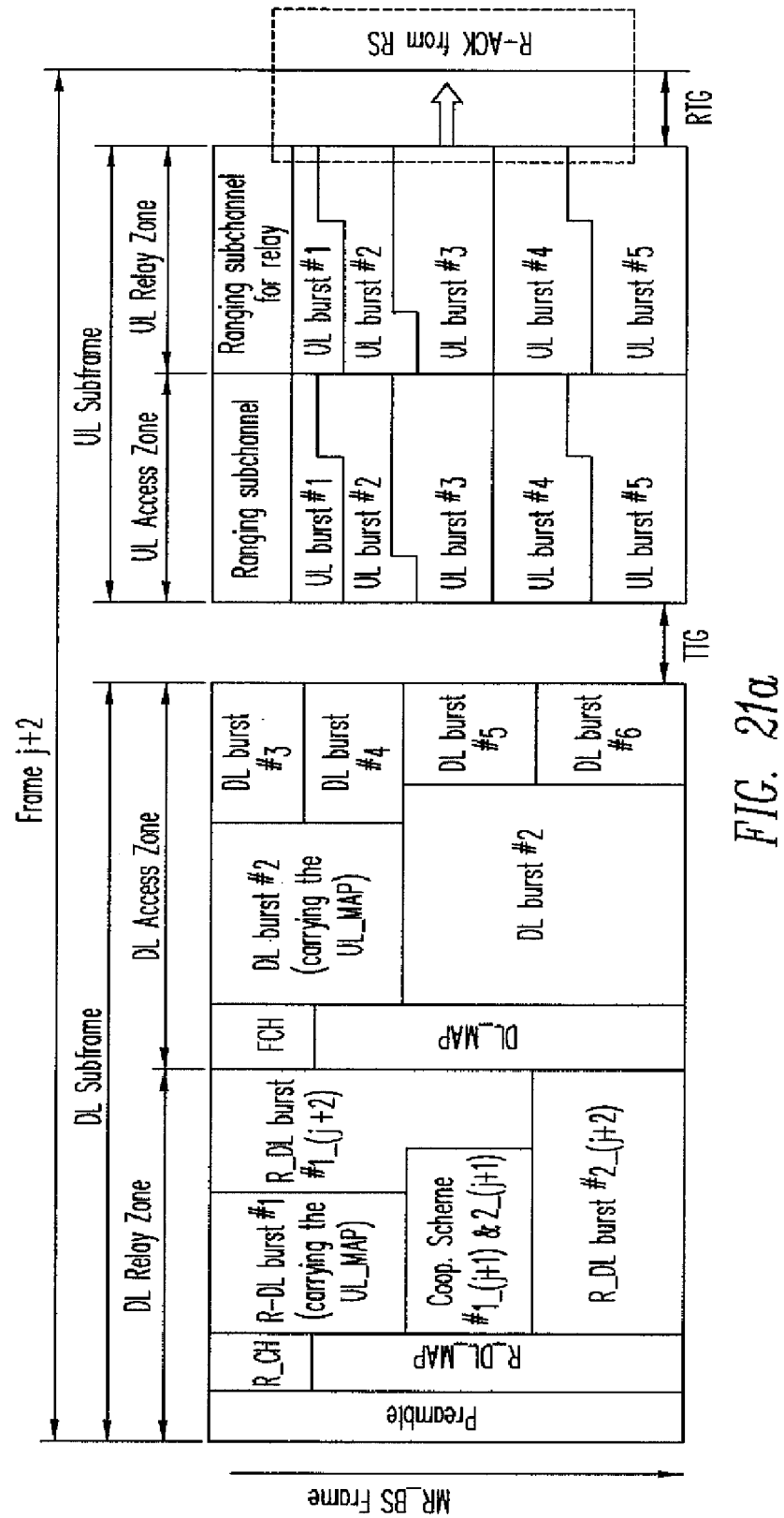
Figure 21B:
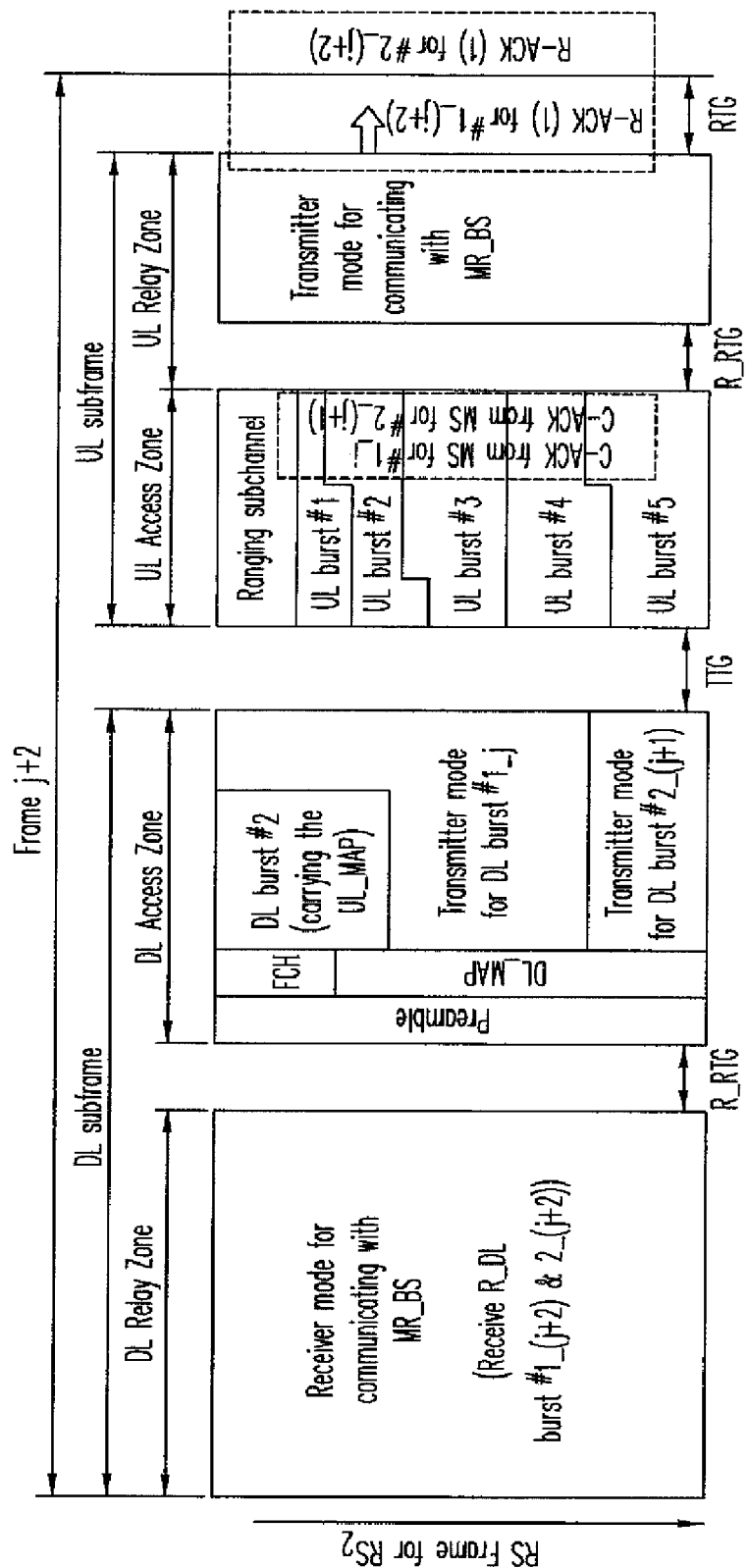
Figure 21C:
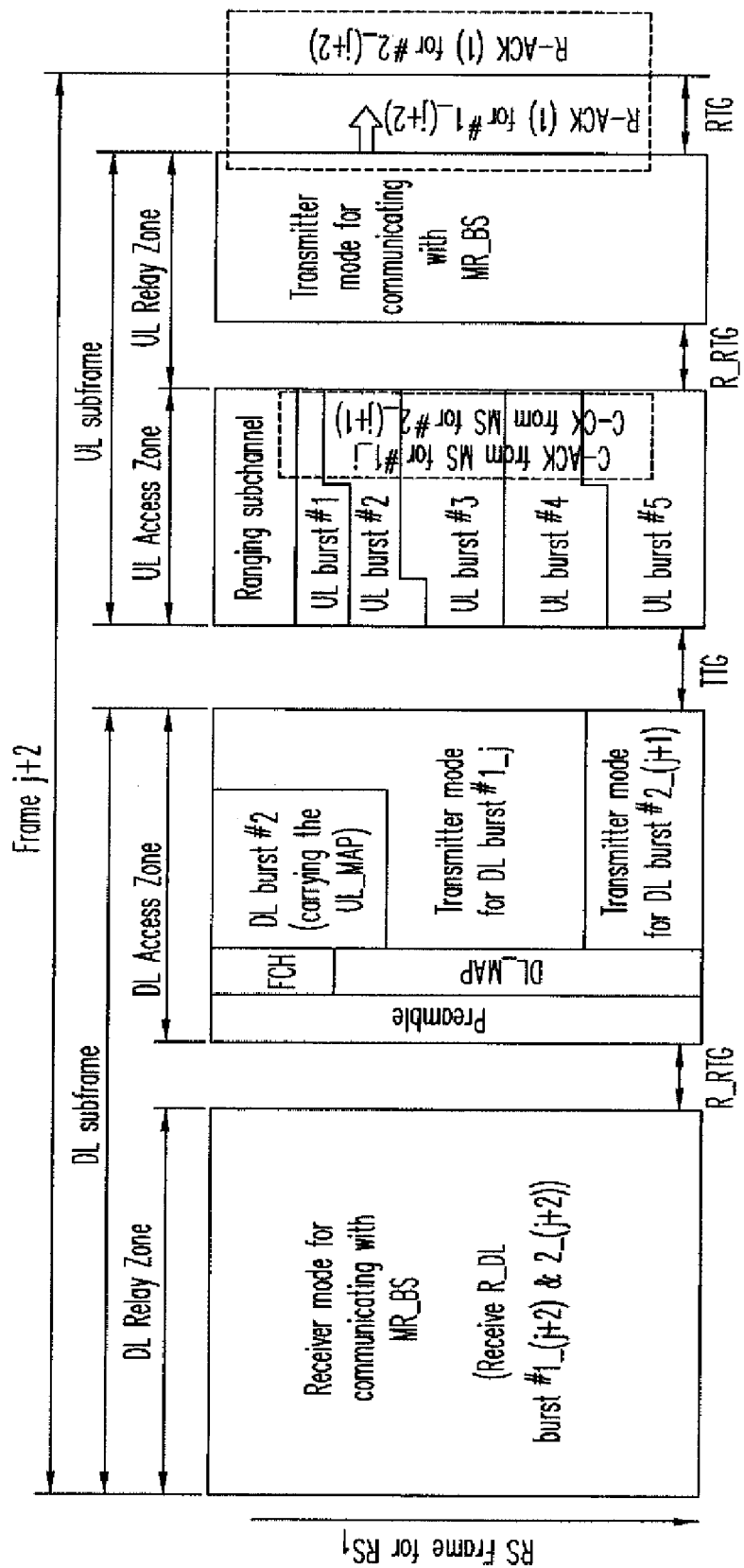

FIGS. 19-21 illustrate a frame structure suitable for use in the embodiment. This frame structure is similar to that used in the IEEE 802.16j standard known to those skilled in the art. FIGS. 19-21 show three successive frames labeled respectively: Frame j, Frame (j+1) and Frame (j+2). Each frame includes an uplink (UL) sub-frame and a downlink (DL) sub-frame, and each sub-frame includes an access zone and a relay zone. In the access zone, the BS communicates with MSs in the BS's direct coverage and the RSs communicate with MSs that are in the RSs' coverage and outside of direct coverage by the BS. The BS notifies the R-group whether or not there is retransmission through the "Cooperative Scheme" message, which may be represented by a single bit (e.g., "0") that denotes the calculated reliability metric is greater than the pre-defined threshold, so that no retransmission is necessary. Conversely, a Cooperative Scheme message having a value of "1" denotes retransmission by the BS to the R-group. In the access zone, the unreliable RSs overhear the transmission between the reliable RS or connecting RSs and the MS. In contrast, in the relay zone, the BS communicates with RSs. The R-ACK, C-ACK and C-NACK messages can be embedded in a control message in the UL.

Under non-orthogonal distributed space-time codes, it may be necessary to exchange of ACK or NACK messages among the reliable RSs and the unreliable RSs. In that case, an ACK message or a NACK message may be transmitted on different sub-carriers for different RSs. As discussed above, in an OFDMA-based system, different users are each allocated a non-overlapping set of sub-carriers (i.e., frequencies) for use in communication, to allow the RSs to transmit and receive at the same time. For non-OFDMA systems, a RS may not be able to both transmit and receive at the same time. Under that situation, some RSs cannot overhear transmissions of unreliable RSs. However, the unreliable RSs can still overhear the transmissions between the reliable RSs or connecting RSs, and the target MS, if the unreliable RSs do not have any data to transmit to any other users.

The above detailed description is provided to illustrate the specific embodiments of the present invention and is not intended to be limiting. Numerous variations and modification within the scope of the present invention are possible. The present invention is set forth in the following claims.

We claim:

1. A method for data transmission to a mobile station from a base station using a plurality of relay stations, comprising:
   determining a relay group of relay stations from the plurality of relay stations;
   classifying each relay station in the relay group as either a reliable relay station or as an unreliable relay station with regard to a channel condition between each relay station and the base station and between each relay station and the mobile station;
   cooperatively transmitting a data packet from the base station through the reliable relay stations to the mobile station, wherein unreliable relay stations that reliably overhear the transmission of the data packet are overheard reliable relay stations; and
   at each relay station in the relay group, receiving a positive acknowledgement or a negative acknowledgement of receipt of the data packet from the mobile station; and
   if a negative acknowledgment is received, cooperatively re-transmitting the data packet through the reliable relay stations and the overheard reliable relay stations.

2. The method of claim 1, wherein determining the relay group of relay stations comprises:
   at each of the relay stations, receiving a message from the mobile station, wherein each relay station evaluates the message to determine whether the mobile station is in its coverage;
   for each of the relay stations, reporting to the base station whether the mobile station is in the coverage, wherein the base station constructs the relay group of the relay stations based upon the reports.

3. The method of claim 2, wherein classifying the relay stations comprises:
   at each of the relay stations in the relay group, receiving a data packet from the base station and determining an individual reliability from the received data packet; and
   at each of the relay stations in the relay group, transmitting an indication of its individual reliability to the base station.

4. The method of claim 3, wherein transmitting the indication of the individual reliability comprises each relay station positively acknowledging or negatively acknowledging the received data packet, and wherein each relay station that positively acknowledges is a reliable relay station and each relay station that negatively acknowledges is an unreliable relay station.

* * * * *